US012810758B2

(12) United States Patent
Lee et al.

(10) Patent No.: US 12,810,758 B2
(45) Date of Patent: Nov. 24, 2026

(54) DISPLAY APPARATUS INCLUDING DRIVER SETS HAVING AT LEAST ONE FIRST DRIVER AND AT LEAST ONE SECOND DRIVER

(71) Applicant: Samsung Display Co., Ltd., Yongin-Si (KR)

(72) Inventors: Donghoon Lee, Yongin-si (KR); Ilnam Kim, Yongin-si (KR); Minkyu Woo, Yongin-si (KR); Jaeyong Jang, Yongin-si (KR); Minjae Jeong, Yongin-si (KR); Jaehyung Cho, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/078,608

(22) Filed: Mar. 13, 2025

(65) Prior Publication Data

US 2025/0384800 A1 Dec. 18, 2025

(30) Foreign Application Priority Data

Jun. 12, 2024 (KR) ........................ 10-2024-0076613

(51) Int. Cl.
*G09G 3/32* (2016.01)
*G09G 3/00* (2006.01)

(52) U.S. Cl.
CPC ............... *G09G 3/035* (2020.08); *G09G 3/32* (2013.01); *G09G 2310/0286* (2013.01)

(58) Field of Classification Search
None
See application file for complete search history.

(56) References Cited

U.S. PATENT DOCUMENTS

| | | | | |
|---|---|---|---|---|
| 11,837,173 | B2 | 12/2023 | Yun | |
| 2009/0102758 | A1* | 4/2009 | Anzai | G09G 3/2096 345/76 |
| 2017/0338295 | A1* | 11/2017 | Lee | H10K 59/131 |
| 2022/0199033 | A1* | 6/2022 | Hong | G09G 3/3275 |
| 2022/0415250 | A1* | 12/2022 | Choi | G09G 3/3208 |
| 2023/0096265 | A1* | 3/2023 | Kim | G11C 19/28 345/213 |

(Continued)

FOREIGN PATENT DOCUMENTS

| | | | |
|---|---|---|---|
| CN | 116918484 | A | 10/2023 |
| KR | 1020210083620 | A | 7/2021 |
| KR | 1020220030493 | A | 3/2022 |

*Primary Examiner* — Donna V Bocar
(74) *Attorney, Agent, or Firm* — Innovation Counsel LLP

(57) ABSTRACT

Provided is a display apparatus including a substrate including a display area and a non-display area surrounding the display area, a plurality of pixels disposed on the substrate in the display area, a plurality of driver sets spaced apart from each other in the non-display area, and a dummy driver located between two adjacent driver sets among the plurality of driver sets. One driver set among the plurality of driver sets includes at least one first driver and at least one second driver. The first driver is connected to m output lines which are connected to some of the plurality of pixels, the second driver is connected to n output lines which are connected to some of the plurality of pixels. When a least common multiple of m and n is o, the driver set includes o/m first drivers and o/n second drivers.

16 Claims, 15 Drawing Sheets

(56) References Cited

U.S. PATENT DOCUMENTS

| | | | | |
|---|---|---|---|---|
| 2023/0126345 | A1 | 4/2023 | Kwak et al. | |
| 2023/0197011 | A1* | 6/2023 | Hong | G09G 3/3233 345/212 |
| 2024/0161678 | A1* | 5/2024 | Piao | G09G 3/20 |
| 2024/0249678 | A1 | 7/2024 | Bai et al. | |
| 2025/0111828 | A1* | 4/2025 | Wang | G09G 3/20 |

* cited by examiner

DISPLAY APPARATUS INCLUDING DRIVER SETS HAVING AT LEAST ONE FIRST DRIVER AND AT LEAST ONE SECOND DRIVER

CROSS-REFERENCE TO RELATED APPLICATION

This application is based on and claims priority under 35 USC § 119 to Korean Patent Application No. 10-2024-0076613, filed on Jun. 12, 2024, in the Korean Intellectual Property Office, the disclosure of which is incorporated by reference herein in its entirety.

BACKGROUND

1. Field

One or more embodiments relate to a display apparatus including a pixel and a driver.

2. Description of the Related Art

A display apparatus includes a plurality of pixels, a gate driving circuit, a data driving circuit, etc. The gate driving circuit includes stages connected to output lines, and the stages supply gate signals to the output lines connected to the stages.

SUMMARY

A portion of a display apparatus may be curved. For example, the display apparatus may include rounded corners. That is, a corner area among outer areas of the display apparatus may be curved. When a driving circuit is placed along such a corner area, output deviation may occur because a distance between driving circuits or a distance between drivers of each driving circuit may not be constant. Accordingly, one or more embodiments include a display apparatus in which such output deviation is alleviated.

The technical issues to be solved by one or more embodiments are not limited to the aforementioned technical issues, and other technical issues that may be solved by one or more embodiments may be anticipated by one of ordinary skill in the art from the description of one or more embodiments.

Additional aspects will be set forth in part in the description which follows and, in part, will be apparent from the description, or may be learned by practice of the presented embodiments of the disclosure.

According to one or more embodiments, a display apparatus includes a substrate including a display area and a non-display area surrounding the display area, a plurality of pixels disposed on the substrate in the display area, a plurality of driver sets spaced apart from each other in the non-display area, and a dummy driver located between two adjacent driver sets among the plurality of driver sets. One driver set among the plurality of driver sets includes at least one first driver and at least one second driver. The at least one first driver is connected to m output lines which are connected to some of the plurality of pixels, and the at least one second driver is connected to n output lines which are connected to some of the plurality of pixels. When a least common multiple of m and n is o, the one driver set includes o/m first drivers and o/n second drivers.

In an embodiment, the at least one first driver may include a control stage and m output stages. The control stage may be connected to an input terminal to which a start signal is input, a first voltage input terminal to which a first voltage is input, and a second voltage input terminal to which a second voltage is input, and may control voltages of a first node and a second node. Each of the m output stages may be connected to an output terminal connected to a corresponding output line among the m output lines, and the m output stages may be connected to the first node and the second node and share the control stage.

In an embodiment, the m output stages may be spaced apart from each other at regular intervals.

In an embodiment, the control stage may include a first transistor connected to the input terminal and the first node, and including a gate connected to a first clock terminal to which one of a plurality of clock signals is input, a second transistor connected to the second node and the first clock terminal, and including a gate connected to the first node, and a third transistor connected to the second voltage input terminal and the second node, and including a gate connected to the first clock terminal.

In an embodiment, the first transistor may include a 1-1 transistor and a 1-2 transistor. The 1-1 transistor may be connected to the input terminal and the 1-2 transistor, the 1-2 transistor may be connected to the first node and the 1-1 transistor, and a gate of the 1-1 transistor and a gate of the 1-2 transistor may be connected to the first clock terminal.

In an embodiment, each of the m output stages may include a fourth transistor connected to the first voltage input terminal and the output terminal, and including a gate connected to the second node, a fifth transistor connected to the output terminal and a second clock terminal to which another one of the plurality of clock signals is input, and including a gate connected to a third node, and a sixth transistor connected to the first node and the third node, and including a gate connected to the second voltage input terminal.

In an embodiment, at least one of the m output stages may further include at least one of a first capacitor connected to the first voltage input terminal and the second node, and a second capacitor connected to the output terminal and the third node.

In an embodiment, o/m may be a natural number greater than or equal to 2 and one of the m output stages of one of the o/m first drivers may be connected to the control stage of another one of the o/m first drivers.

In an embodiment, the non-display area may include a corner area adjacent to a corner of the substrate and the plurality of driver sets may be arranged in the corner area.

In an embodiment, at least one of the m output lines connected to the first driver and at least one of the n output lines connected to the second driver may be connected to a same pixel.

According to one or more embodiments, a display apparatus includes a substrate including a display area and a non-display area surrounding the display area, a plurality of pixels disposed on the substrate in the display area, and a driver set arranged in the non-display area and connected to at least one of the plurality of pixels. The first driver of the driver set may include a control stage and m output stages sharing the control stage, and at least some of the m output stages may be spaced apart from each other at regular intervals.

In an embodiment, the control stage may be connected to an input terminal to which a start signal is input, a first voltage input terminal to which a first voltage is input, and a second voltage input terminal to which a second voltage is input, and may control voltages of a first node and a second node. Each of the m output stages may be connected to an output terminal configured to output an output signal to a corresponding output line, and the m output stages may be connected to the first node and the second node and share the control stage.

In an embodiment, the control stage may include a first transistor connected to the input terminal and the first node, and including a gate connected to a first clock terminal to which one of a plurality of clock signals is input, a second transistor connected to the second node and the first clock terminal, and including a gate connected to the first node, and a third transistor connected to the second voltage input terminal and the second node, and including a gate connected to the first clock terminal.

In an embodiment, each of the m output stages may include a fourth transistor connected to the first voltage input terminal and the output terminal, and including a gate connected to the second node, a fifth transistor connected to the output terminal and a second clock terminal to which another one of the plurality of clock signals is input, and comprising a gate connected to a third node, and a sixth transistor connected to the first node and the third node, and including a gate connected to the second voltage input terminal.

In an embodiment, at least one of the m output stages may further include at least one of a first capacitor connected to the first voltage input terminal and the second node, and a second capacitor connected to the output terminal and the third node.

In an embodiment, the driver set may include at least two first drivers and the output terminal of one of the m output stages of one of the at least two first drivers may be connected to the input terminal of the control stage of another one of the at least two first drivers.

In an embodiment, the non-display area may include a corner area adjacent to a corner of the substrate and the driver set may be arranged in the corner area.

In an embodiment, the driver set may include at least one second driver connected to n output lines connected to some of the plurality of pixels.

In an embodiment, when a least common multiple of m and n may be o, the driver set may include o/m first drivers and o/n second drivers.

In an embodiment, the display apparatus may include a plurality of the driver sets including the driver set, and a dummy driver located between adjacent two of the plurality of driver sets.

BRIEF DESCRIPTION OF THE DRAWINGS

The above and other aspects, features, and advantages of certain embodiments of the disclosure will be more apparent from the following description taken in conjunction with the accompanying drawings.

DETAILED DESCRIPTION

Figure 1:
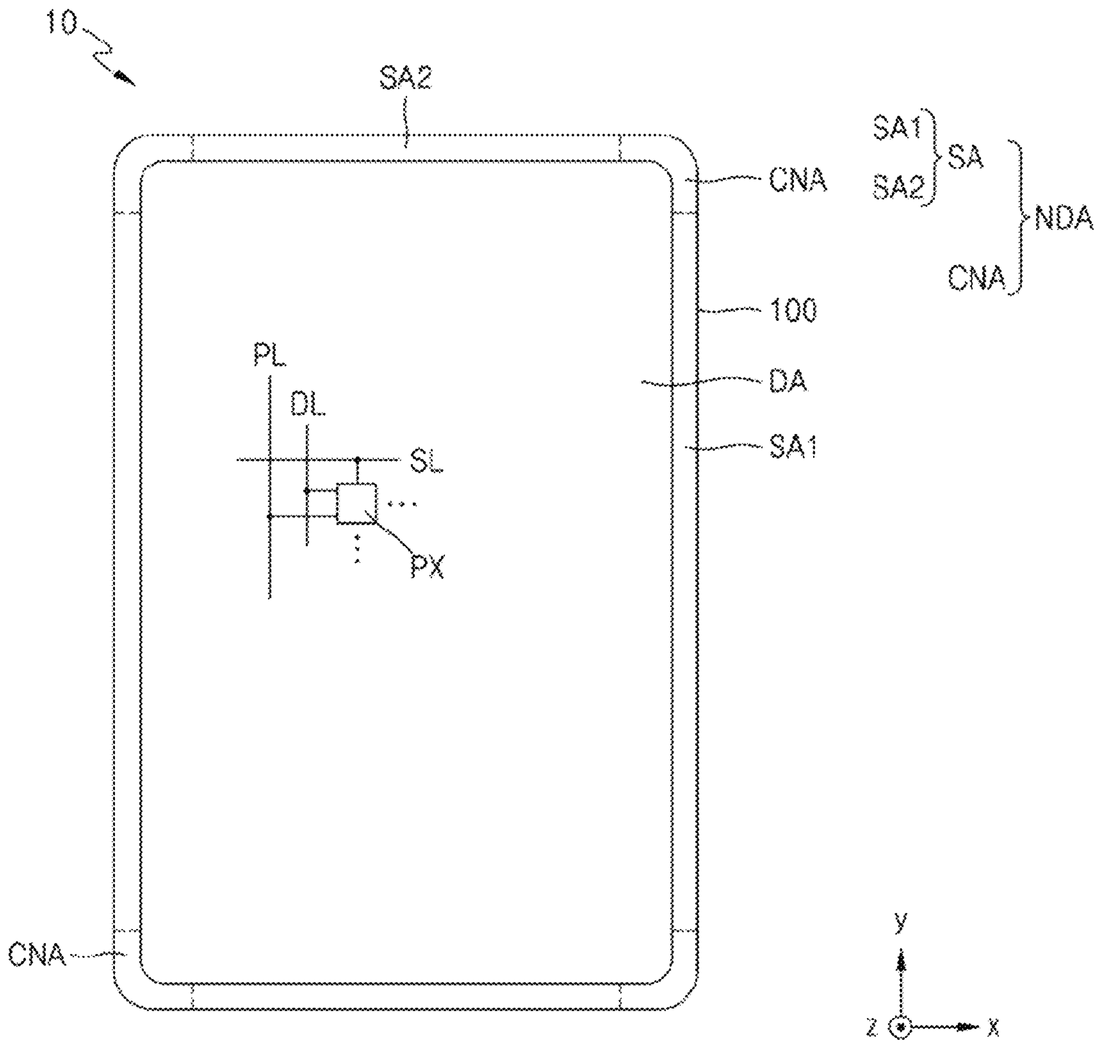
FIG. 1 is a schematic plan view of a display apparatus according to an embodiment.

As the disclosure allows for various changes and numerous embodiments, certain embodiments will be illustrated in the drawings and described in the written description. Effects and features of one or more embodiments and methods of accomplishing the same will become apparent from the following detailed description of the one or more embodiments, taken in conjunction with the accompanying drawings. However, one or more embodiments may have different forms and should not be construed as being limited to the descriptions set forth herein.

While such terms as “first” and “second” may be used to describe various elements, such elements are not limited to the above terms. The above terms are used only to distinguish one element from another.

The singular forms “a,” “an,” and “the” as used herein are intended to include the plural forms as well unless the context clearly indicates otherwise.

The terms “include,” “comprise,” and “have” as used herein specify the presence of stated features or elements but do not preclude the addition of one or more other features or elements.

When a layer, region, or element is referred to as being on another layer, region, or element, it may be directly or indirectly on the other layer, region, or element. That is, for example, intervening layers, regions, or elements may be present. The same applies to expressions such as below, on the left, and on the right.

Sizes of elements in the drawings may be exaggerated or reduced for convenience of explanation. For example, because sizes and thicknesses of elements in the drawings are arbitrarily illustrated for convenience of explanation, the following embodiments are not limited thereto.

The expression “A and/or B” refers to “A,” “B,” or “A and B.” The expression “at least one of A or B” refers to “A,” “B,” or “A and B.”

A case in which A and B are connected may include a case in which A and B are electrically connected, a case in which A and B are functionally connected, and a case in which A and B are directly connected. In this case, A and B may be certain objects (e.g., devices, elements, circuits, wiring, electrodes, terminals, conductive films, etc.). Therefore, a connection is not limited to a certain connection, for example, a connection shown in the drawings or described in the detailed description, and may also include other connections.

A case in which A and B are electrically connected to each other may include a case in which, for example, at least one element (e.g., a switch, a transistor, a capacitive element, an inductor, a resistance element, a diode, or the like) that enables an electrical connection between A and B is connected between A and B.

In the following embodiments, the term "on" used in connection with a device state may refer to an activated state of the device, and the term "off" may refer to a deactivated state of the device. The term "on," as used in connection with a signal received by a device, may refer to a signal that activates the device, and the term "off" may refer to a signal that deactivates the device. The device may be activated by a high-level voltage or a low-level voltage. For example, a P-channel transistor (P-type transistor) is activated by a low-level voltage and an N-channel transistor (N-type transistor) is activated by a high-level voltage. Therefore, it should be understood that "on" voltages for the P-type transistor and the N-type transistor are opposite (low vs. high) voltage levels.

In the following embodiments, an x-direction, a y-direction, and a z-direction are not limited to directions along three axes of the Cartesian coordinate system, and may be interpreted in a broader sense. For example, the x-direction, the y-direction, and the z-direction may be orthogonal to each other, or may alternatively refer to different directions that are not orthogonal to each other.

A display apparatus according to an embodiment may be an apparatus for displaying moving images or still images, and may be used as a display screen for not only portable electronic devices, such as mobile phones, smartphones, tablet personal computers (PCs), mobile communication terminals, electronic notebooks, portable multimedia players (PMPs), navigation devices, and ultra mobile PCs (UMPCs), but also for various products such as televisions, laptops computers, monitors, billboards, and Internet of Things (IoT) devices. In addition, a display apparatus according to an embodiment may be utilized in a wearable device, such as a smart watch, a watch phone, a glasses-type display, or a head mounted display (HMD). In addition, the display apparatus according to an embodiment may be utilized in an instrument panel of a vehicle, a center information display (CID) arranged on a center fascia or dashboard of a vehicle, a mirror display replacing a sideview mirror of a vehicle, or a display arranged on the back of a front seat of a vehicle for entertainment for backseat passengers in the vehicle. Additionally, the display apparatus may be a flexible apparatus.

FIG. 1 is a schematic plan view of a display apparatus 10 according to an embodiment.

Referring to FIG. 1, the display apparatus 10 may include a display area DA where an image is displayed and a non-display area NDA outside the display area DA. The display area DA may be surrounded by the non-display area NDA.

In a plan view of the display apparatus 10, the display apparatus 10 may have a substantially rectangular shape. In an embodiment, the display apparatus 10 may have a polygonal shape, such as a triangle, a pentagon, or a hexagon, a circle, an oval, or an irregular shape. The display apparatus 10 may have rounded corners. In an embodiment, the display apparatus 10 may have a shape in which a length in a y direction is greater than a length in an x direction, as shown in FIG. 1. In an embodiment, the display apparatus 10 may have a shape in which the length in the x direction is longer than the length in the y direction.

The display apparatus 10 may include a display panel, and may include a cover window disposed above the display panel to protect the display panel. Various components of the display apparatus 10 may be disposed on a substrate 100. The substrate 100 may include the display area DA and the non-display area NDA surrounding the display area DA.

A plurality of pixels PX may be arranged in the display area DA. A plurality of scan lines SL, a plurality of data lines DL, and the plurality of pixels PX connected to the plurality of scan lines SL and the plurality of data lines DL may be arranged in the display area DA. The plurality of pixels PX may be arranged in any one of various forms, such as a stripe arrangement, a Pentile arrangement, a diamond arrangement, or a mosaic arrangement to realize an image. Each pixel PX includes a light-emitting diode (LED) as a display element (light-emitting device), and the light-emitting diode may be connected to a pixel circuit. The pixel circuit may include a plurality of transistors and at least one capacitor. The pixel PX may emit, for example, red, green, blue, or white light through the light-emitting diode. Each pixel PX may be connected to a corresponding scan line SL among the plurality of scan lines SL and a corresponding data line DL among the plurality of data lines DL.

The scan lines SL may each extend in the x-direction (row direction) and be connected to the pixels PX arranged in the same row. The scan lines SL may each be configured to transmit a scan signal to the pixels PX in the same row. The data lines DL may each extend in the y-direction (column direction) and be connected to the pixels PX located in the same column. The data lines DL may each be configured to transmit data signals to each of the pixels PX in the same column in synchronization with the scan signal. Each pixel PX may be connected to a driving voltage line PL to receive a driving voltage. The driving voltage lines PL may each extend in the y direction (column direction) and be connected to the pixels PX arranged in the same column. FIG. 1 shows an example in which the pixel PX is connected to one scan line SL, but the disclosure is not limited thereto. The pixel PX may be connected to a plurality of scan lines SL. Each of the pixel circuits that drive the pixels PX may be electrically connected to outer circuits arranged in the non-display area NDA.

The non-display area NDA may entirely surround the display area DA. Outer circuits (driving circuits) configured to transmit driving signals to the pixel circuits configured to drive the above-described pixels PX may be arranged in the non-display area NDA. The non-display area NDA may include a side area SA at a side of the display area DA and a corner area CNA at a corner of the display area DA. In an embodiment, the side area SA may include a first side area SA1 in the x-direction of the display area DA and a second side area SA2 in the y-direction of the display area DA. In an embodiment, the first side area SA1 and the second side area SA2 may contact each other at the corner area CNA. The above-described outer circuits (drive circuits) may be arranged in the side area SA (e.g., the first side area SA1 and the second side area SA2) and/or the corner area CNA.

Figure 2:
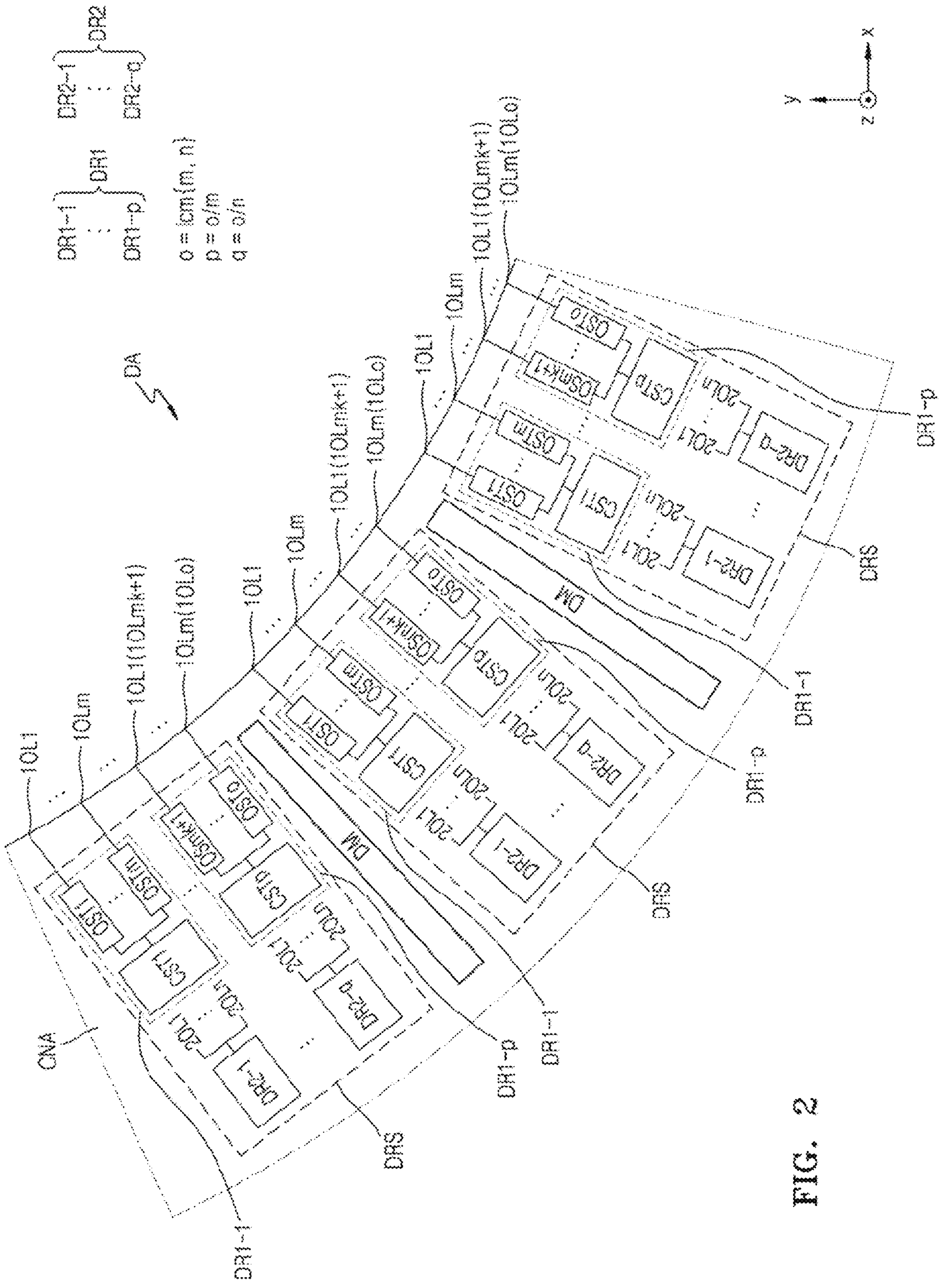
FIG. 2 is an enlarged plan view of a portion of a display apparatus according to an embodiment.

FIG. 2 is an enlarged plan view of a portion of the display apparatus 10 according to an embodiment, and particularly, is an enlarged plan view of the corner area CNA of the display apparatus 10.

Referring to FIGS. 1 and 2 together, a plurality of driver sets DRS may be arranged in the corner area CNA of the display apparatus 10. In an embodiment, a dummy driver DM may be arranged between two adjacent driver sets DRS. In an embodiment, the dummy driver DM may not be arranged between two adjacent driver sets DRS, and in this case, the two adjacent driver sets DRS may be spaced apart from each other.

In an embodiment, the plurality of driver sets DRS may be connected to the plurality of pixels PX located in the display area DA of the display apparatus 10. In an embodiment, the plurality of driver sets DRS may be connected to a plurality of output lines, and the plurality of output lines may be respectively connected to the above-described scan lines SL and to the plurality of pixels PX. In an embodiment, each driver set DRS may be connected to at least m first output lines 1OL1 to 1OLm. In an embodiment, each driver set DRS may be connected to at least n second output lines 2OL1 to 2OLn. In the disclosure, the n second output lines 2OL1 to 2OLn are shown as being within the driver set DRS (or within the corner area CNA), but this is for convenience of illustration and description, and the disclosure is not limited thereto. The dummy driver DM may not be connected to an output line (e.g., a first output line or a second output line).

In the following description, o may be the least common multiple (LCM) of m and n, p may be a value obtained by dividing o by m, and q may be a value obtained by dividing o by n. That is, o=lcm{m,n}, p=o/m, and q=o/n.

In an embodiment, each driver set DRS may include a plurality of first drivers DR1. In an embodiment, the driver set DRS may include p first drivers DR1-1 to DR1-*p*.

In an embodiment, each first driver DR1 may include one control stage and m output stages. For example, the 1-1 driver DR1-1 may include one control stage CST1 and m output stages OST1 to OSTm. In another example, the 1-p driver DR1-*p* may include one control stage CSTp and m output stages OSTmk+1 to OSTo. Accordingly, one driver set DRS may include a total of p control stages CST1 to CSTp and a total of p*m, that is, o output stages OST1 to OSTo.

In an embodiment, each output stage of a first driver DR1 may be connected to a corresponding first output line. For example, the m output stages OST1 to OSTm of the 1-1 driver DR1-1 may be respectively connected to the corresponding m first output lines 1OL1 to 1OLm. In another example, the m output stages OSTmk+1 to OSTo of the 1-p driver DR1-*p* may be respectively connected to the corresponding m first output lines 1OLmk+1 to 1OLo. Accordingly, one driver set DRS may be connected to a total of o first output lines 1OL1 to 1OLo.

In an embodiment, m output stages of the first driver DR1 may be connected to one corresponding control stage. For example, the m output stages OST1 to OSTm of the 1-1 driver DR1-1 may be connected to one corresponding control stage CST1. In another example, the m output stages OSTmk+1 to OSTo of the 1-p driver DR1-*p* may be connected to one corresponding control stage CSTp.

In an embodiment, the first drivers DR1 in the driver sets DRS may be arranged at regular intervals. For example, at least some of the p first drivers DR1-1 to DR1-*p* of the driver sets DRS may be arranged at regular intervals. In an embodiment, the m output stages in the first driver DR1 may be arranged at regular intervals. For example, at least some of the m output stages OST1 to OSTm of the 1-1 driver DR1-1 may be arranged at regular intervals. In another example, at least some of the m output stages OSTmk+1 to OSTo of the 1-p driver DR1-*p* may be arranged at regular intervals.

In an embodiment, each driver set DRS may include a plurality of second drivers DR2. In an embodiment, the driver set DRS may include q second drivers DR2-1 to DR2-*q*.

In an embodiment, one second driver DR2 may be connected to corresponding n second output lines 2OL1 to 2OLn. For example, the 2-1 driver DR2-1 may be connected to the corresponding n second output lines 2OL1 to 2OLn. In another example, the 2-q driver DR2-*q* may be connected to the corresponding n second output lines 2OL1 to 2OLn. Accordingly, one driver set DRS may be connected to a total of q*n, that is, o second output lines.

In an embodiment, some of the at least m first output lines 1OL1 to 1OLm and the at least n second output lines 2OL1 to 2OLn connected to the driver set DRS may be connected to the same pixel PX. For example, some of the m first output lines 1OL1 to 1OLm connected to the 1-1 driver DR1-1 may be connected to the same pixel PX as also some of the n second output lines 2OL1 to 2OLn connected to the 2-1 driver DR2-1.

In an embodiment, the plurality of driver sets DRS may be arranged along a curve of the corner area CNA. For example, the adjacent driver sets DRS may rotate at a certain angle about a certain axis (e.g., a z-direction axis). In an embodiment, a distance by which the driver sets DRS are spaced apart from each other in an area far from the display area DA may be greater than a distance by which the driver sets DRS are spaced apart from each other in an area close to the display area DA. In other words, the distance between the driver sets DRS may increase away from the display area DA. This may be due to a rounded corner shape of the display apparatus 10.

The aforementioned description may be summarized as follows.

A driver set of a display apparatus of the disclosure may include at least one first driver and at least one second driver. The first driver may include one control stage and m output stages, and each output stage may be connected to a corresponding first output line. Accordingly, the first driver may be connected to m first output lines. The second driver may be connected to n second output lines. The least common multiple of m and n may be defined as o. A value of o/m may be defined as p. A value of o/n may be defined as q. The p first drivers and the q second drivers may be grouped into one driver set. The o first output lines and the o second output lines may be connected to one driver set. Within one driver set, drivers may be arranged at regular intervals. Each driver set may be spaced apart from another at regular intervals.

In other words, an idea of the disclosure is to find the least common multiple of the number of output lines connected to respective drivers, and then group a number of drivers into one driver set, the number corresponding to a value obtained by dividing the least common multiple by the number of output lines of each driver. An arrangement interval of the drivers within one driver set may be regular. Accordingly, a phenomenon where output deviation occurs between a plurality of output lines connected to one driver may be prevented or at least reduced.

In the disclosure, a case in which two types of drivers (e.g., a first driver and a second driver) are included in a driver set is shown and described, but this is not intended to exclude the cases in which a driver set includes three or more types of drivers. An idea of the disclosure may be applied to embodiments including additional drivers (e.g., third to i-th drivers), as will be clear to one of ordinary skill in the art in light of this disclosure.

Hereinafter, some embodiments will be described with reference to the drawings showing cases in which the above-described m, n, o, p, and q have certain values. Obviously, the disclosure is not necessarily limited to the embodiments described below.

Figure 3:
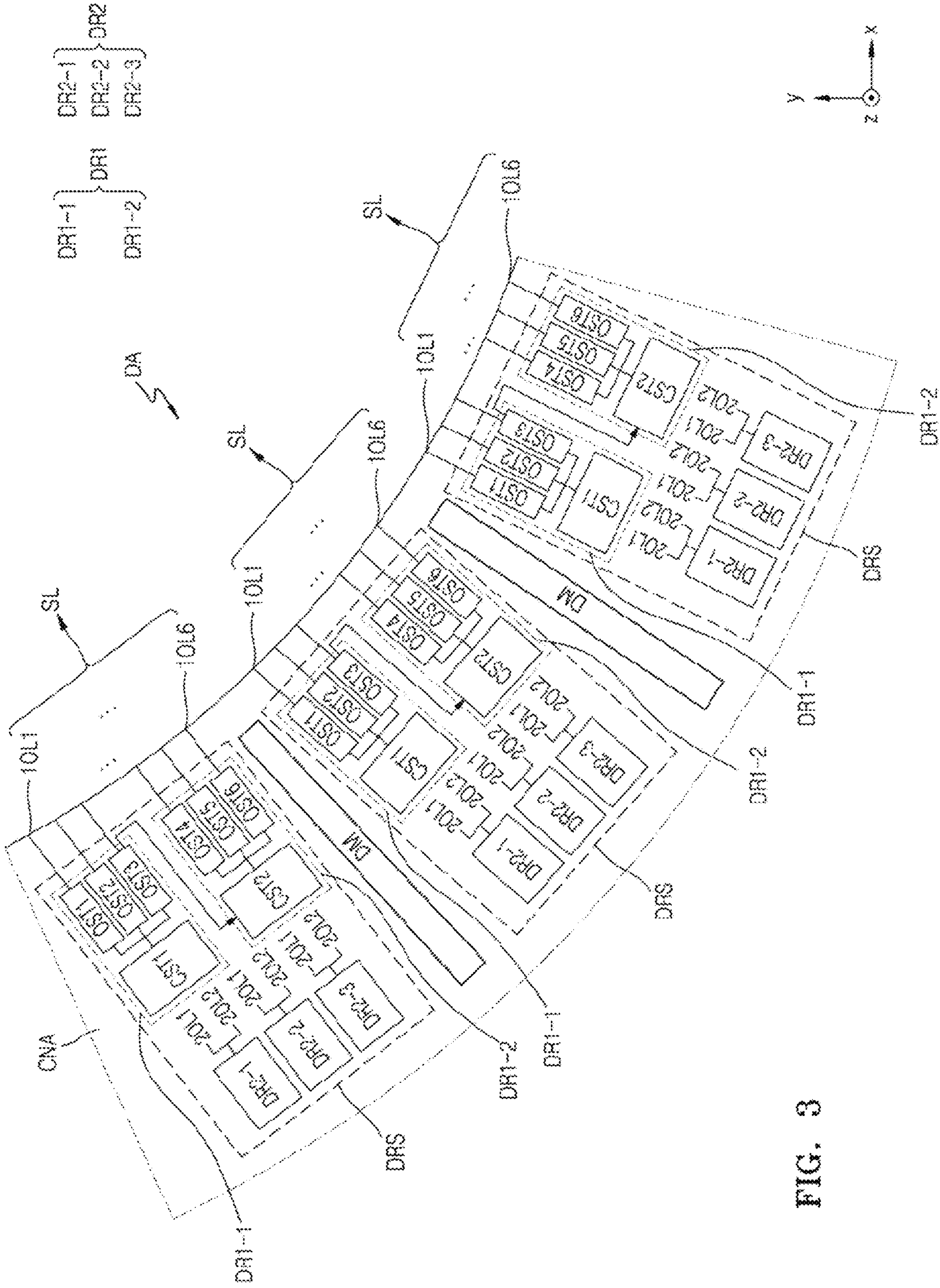
FIG. 3 is an enlarged plan view of a portion of a display apparatus according to an embodiment.
Figure 4:
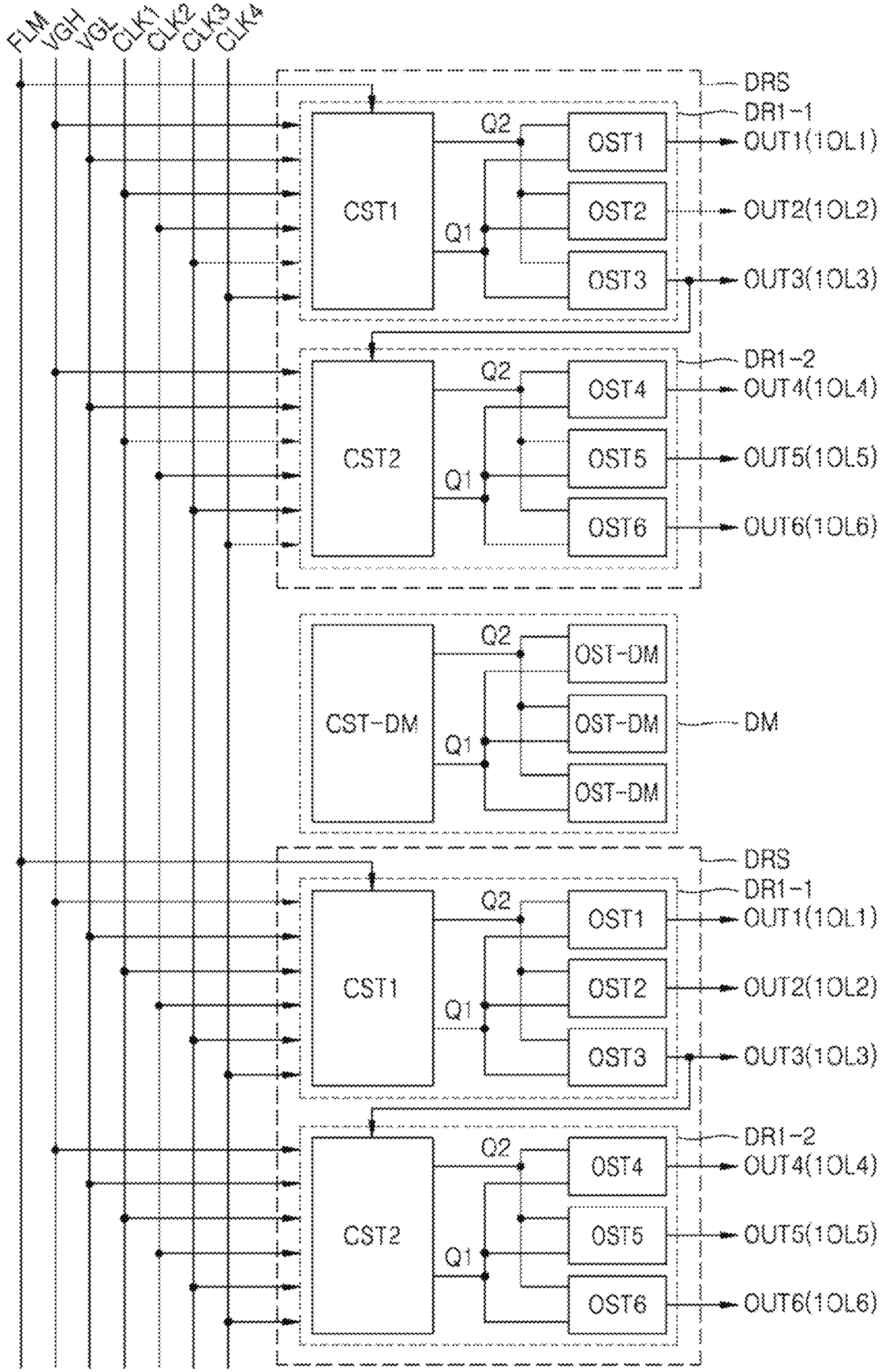
FIG. 4 is a schematic diagram of a driving circuit according to an embodiment.
Figure 5:
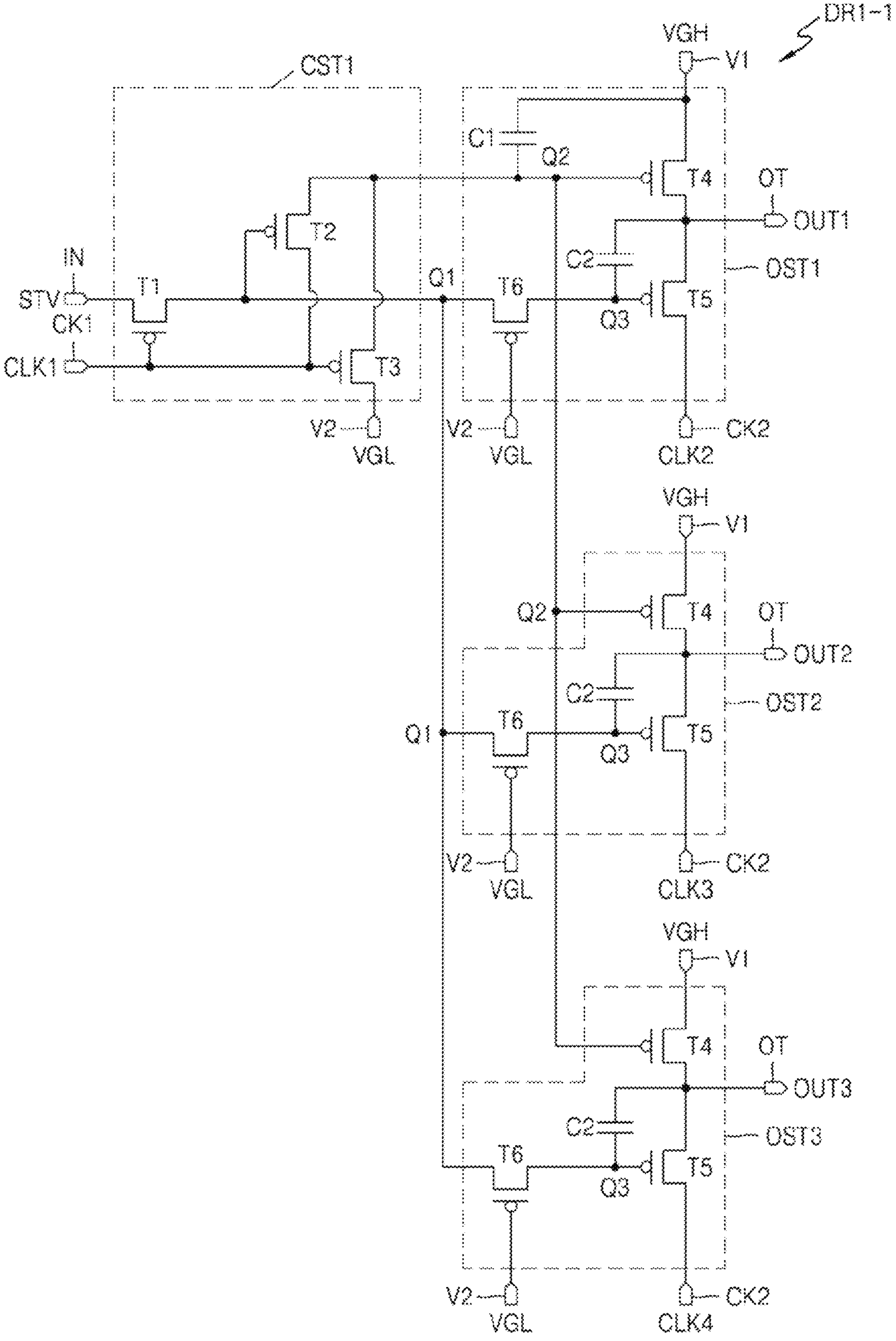
FIG. 5 is an equivalent circuit diagram of a driver according to an embodiment.
Figure 6:
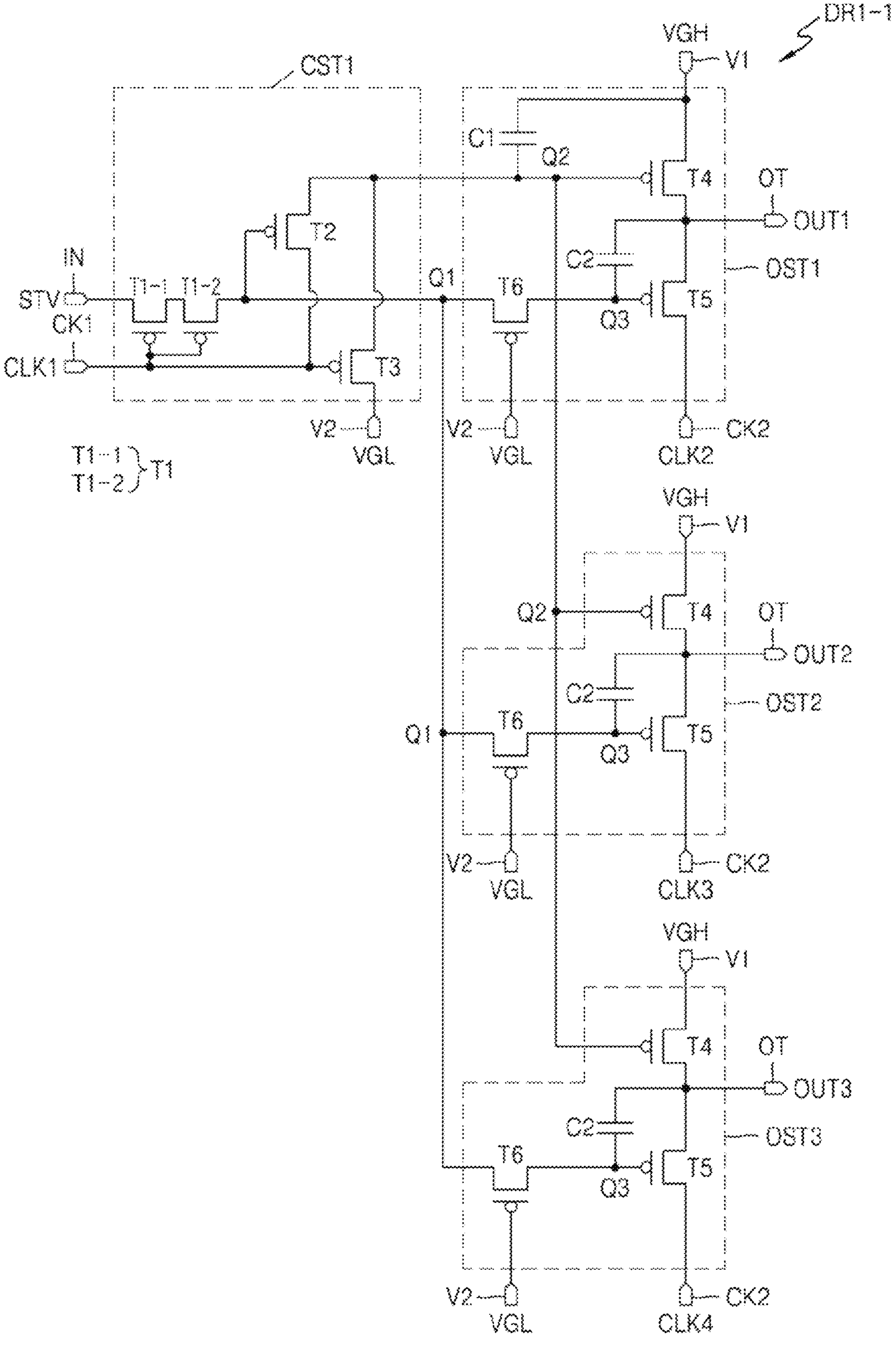
FIG. 6 is an equivalent circuit diagram of a driver according to an embodiment.
Figure 7:
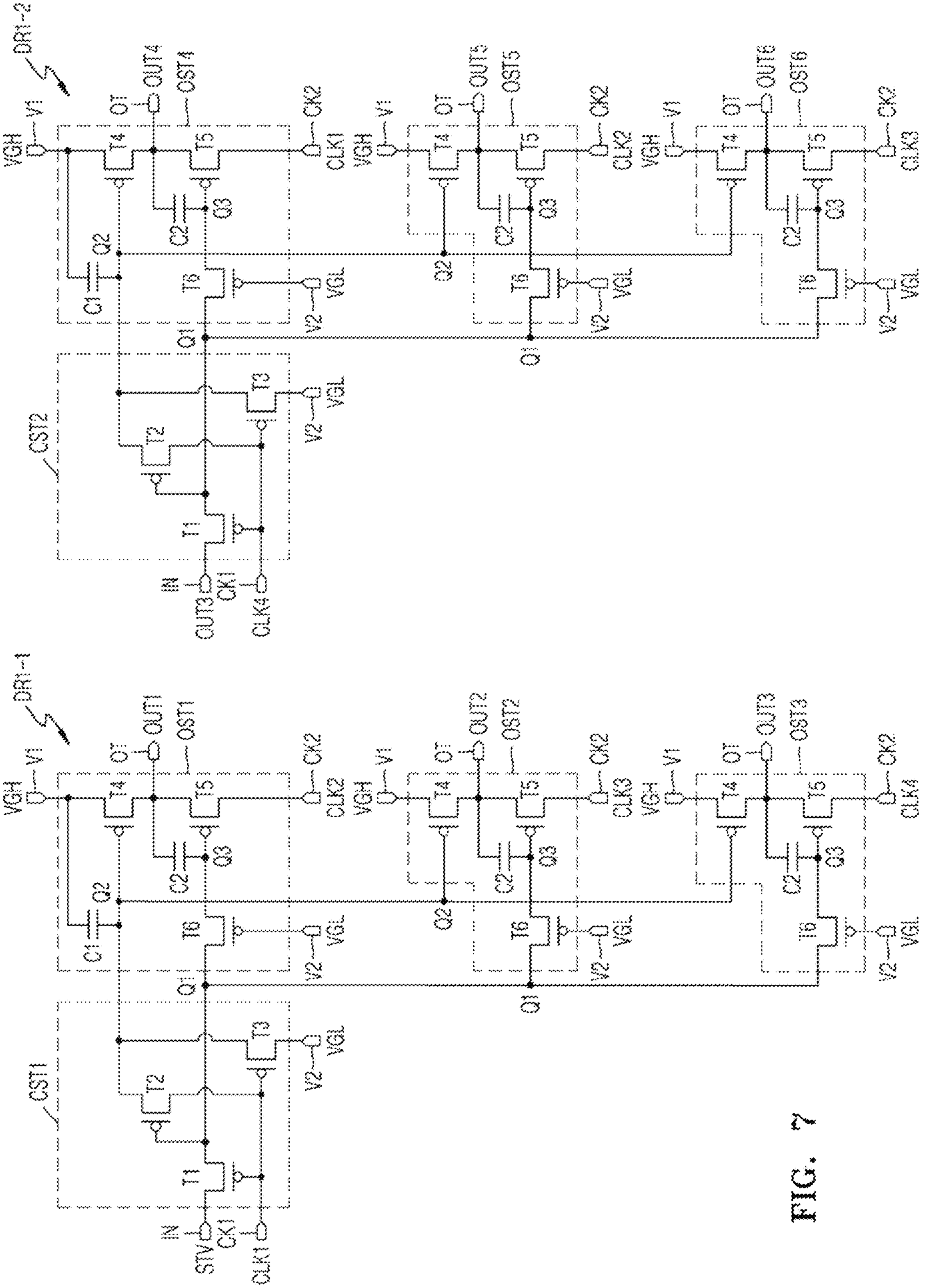
FIG. 7 is an equivalent circuit diagram of a driver according to an embodiment.

FIG. 3 is an enlarged plan view of a portion of a display apparatus according to an embodiment. FIG. 4 is a schematic diagram of a driving circuit according to an embodiment. FIGS. 5 to 7 are equivalent circuit diagrams of a driver according to an embodiment.

In the embodiment which is described below, m may be equal to 3, n may be equal to 2, o may be equal to 6, p may be equal to 2, and q may be equal to 3.

Referring to FIG. 3, the driver set DRS may include the first driver DR1 and the second driver DR2.

In the present embodiment, the driver set DRS may include a plurality of first drivers DR1. For example, the driver set DRS may include two first drivers DR1, that is, a 1-1 driver DR1-1 and a 1-2 driver DR1-2. In other words, in the present embodiment, p, which is the number of first drivers DR1 included in the driver set DRS, may be equal to 2.

In the present embodiment, the driver set DRS may include a plurality of second drivers DR2. For example, the driver set DRS may include three second drivers DR2, that is, a 2-1 driver DR2-1, a 2-2 driver DR2-2, and a 2-3 driver DR2-3. In other words, in the present embodiment, q, which is the number of second drivers DR2 included in the driver set DRS, may be equal to 3.

In the present embodiment, each first driver DR1 may include one control stage and three output stages. The 1-1 driver DR1-1 may include a first control stage CST1, a first output stage OST1, a second output stage OST2, and a third output stage OST3. The 1-2 driver DR1-2 may include a second control stage CST2, a fourth output stage OST4, a fifth output stage OST5, and a sixth output stage OST6.

In the present embodiment, each output stage may be connected to a corresponding first output line. For example, the first output stage OST1 may be connected to a 1-1 output line 1OL1, and the sixth output stage OST6 may be connected to a 1-6 output line 1OL6. The second output stage OST2 to the fifth output stage OST5 may also be connected to the corresponding first output lines. Accordingly, the 1-1 driver DR1-1 may be connected to three first output lines, and the 1-2 driver DR1-2 may also be connected to three first output lines. In other words, the number m of first output lines connected to one first driver DR1 may be equal to 3. The first output lines 1OL1 to 1OL6 may be respectively connected to the plurality of scan lines SL described above with reference to FIG. 1.

In the present embodiment, the third output stage OST3 and the second control stage CST2 may be connected to each other. At least a portion of an output signal of the third output stage OST3 may be transmitted to the second control stage CST2. That is, at least a portion of an output signal of the 1-1 driver DR1-1 may be transmitted to the 1-2 driver DR1-2.

In the present embodiment, each second driver DR2 may be connected to corresponding second output lines. The 2-1 driver DR2-1 may be connected to a 2-1 output line 2OL1 and a 2-2 output line 2OL2. The 2-2 driver DR2-2 may be connected to another 2-1 output line 2OL1 and another 2-2 output line 2OL2. The 2-3 driver DR2-3 may be connected to the other 2-1 output line 2OL1 and the other 2-2 output line 2OL2. In other words, the number n of second output lines connected to one second driver DR2 may be equal to 2. Although not shown in FIG. 3, the second output lines 2OL1 and 2OL2 may be connected to the plurality of scan lines SL described above with reference to FIG. 1.

In the present embodiment, the driver set DRS may be provided in plurality and may be arranged along the curve of the corner area CNA. Dummy drivers DM may be arranged between adjacent driver sets DRS.

Referring to FIG. 4, the driver set DRS may include the 1-1 driver DR1-1 and the 1-2 driver DR1-2.

In the present embodiment, the first control stage CST1, the first output stage OST1, the second output stage OST2, and the third output stage OST3 may be grouped into the 1-1 driver DR1-1. In the present embodiment, the second control stage CST2, the fourth output stage OST4, the fifth output stage OST5, and the sixth output stage OST6 may be grouped into the 1-2 driver DR1-2.

At least two output stages may share one control stage. In the present embodiment, the first output stage OST1, the second output stage OST2, and the third output stage OST3 may share the first control stage CST1. For example, the first output stage OST1, the second output stage OST2, and the third output stage OST3 may be connected to the first control stage CST1 through common nodes such as a first node Q1 and a second node Q2. In the present embodiment, the fourth output stage OST4, the fifth output stage OST5, and the sixth output stage OST6 may share the second control stage CST2. For example, the fourth output stage OST4, the fifth output stage OST5, and the sixth output stage OST6 may be connected to the second control stage CST2 through common nodes such as a first node Q1 and a second node Q2.

Each of the output stages may be connected to the above-described first output line, and may generate an output signal and direct the output signal to a connected first output line. In the present embodiment, the first output stage OST1 may be connected to the 1-1 output line 1OL1 and may direct a first output signal OUT1 to the 1-1 output line 1OL1. In the present embodiment, the second output stage OST2 may be connected to the 1-2 output line 1OL2 and may direct a second output signal OUT2 to the 1-2 output line 1OL2. In the present embodiment, the third output stage OST3 may be connected to the 1-3 output line 1OL3 and may direct a third output signal OUT3 to the 1-3 output line 1OL3. In the present embodiment, the fourth output stage OST4 may be connected to the 1-4 output line 1OL4 and may direct a fourth output signal OUT4 to the 1-4 output line 1OL4. In the present embodiment, the fifth output stage OST5 may be connected to the 1-5 output line 1OL5 and may direct a fifth output signal OUT5 to the 1-5 output line 1OL5. In the present embodiment, the sixth output stage OST6 may be connected to the 1-6 output line 1OL6 and may direct a sixth output signal OUT6 to the 1-6 output line 1OL6.

The first driver, e.g. the 1-1 driver DR1-1 and the 1-2 driver DR1-2, may receive a start signal, a plurality of clock signals, a first voltage VGH, and a second voltage VGL to output a plurality of output signals.

Each control stage may be connected to an input terminal to which a start signal is input, a first clock terminal, a first voltage input terminal to which the first voltage VGH is input, and a second voltage input terminal to which the second voltage VGL is input. In the present embodiment, the first control stage CST1 and the second control stage CST2 may each be connected to an input terminal to which a start signal is input, a first clock terminal, a first voltage input terminal to which the first voltage VGH is input, and a second voltage input terminal to which the second voltage VGL is input.

Each control stage may control a voltage of the first node Q1 and a voltage of the second node Q2 in response to a start signal input to an input terminal and a clock signal input to a first clock terminal. In the present embodiment, the first control stage CST1 and the second control stage CST2 may each control a voltage of the first node Q1 and a voltage of the second node Q2 in response to a start signal input to an input terminal and a clock signal input to a first clock terminal.

Each of the output stages may be connected to a first voltage input terminal, a second voltage input terminal, and a second clock terminal, and may be connected to the first node Q1 and the second node Q2 to output an output signal of a first level voltage or a second level voltage in response to voltages of the first node Q1 and the second node Q2. In the present embodiment, the first output stage OST1 to the sixth output stage OST6 may each be connected to a first voltage input terminal, a second voltage input terminal, and a second clock terminal, and may be connected to the first node Q1 and the second node Q2 to output an output signal of a first level voltage or a second level voltage in response to voltages of the first node Q1 and the second node Q2.

The number of clock signals input to the first driver may be determined depending on the number of output stages included in the first driver. For example, when the number of output stages included in one first driver is m, the plurality of clock signals may include m+1 clock signals. The plurality of clock signals may be phase-shifted by 1/(m+1) cycles. In the present embodiment, the 1-1 driver DR1-1 and the 1-2 driver DR1-2 may each include three output stages. In the present embodiment, the number of clock signals input to the 1-1 driver DR1-1 or the 1-2 driver DR1-2 may be equal to 4. In the present embodiment, the plurality of clock signals may include a first clock signal CLK1, a second clock signal CLK2, a third clock signal CLK3, and a fourth clock signal CLK4.

A clock signal which is input to a second clock terminal may be one of the remaining clock signals excluding a clock signal which is input to a first clock terminal among the plurality of clock signals. Clock signals input to the second clock terminals of the plurality of output stages may be sequentially phase-shifted by 1/(m+1) cycles.

Control stages and output stages may begin operation by receiving a start signal. A start signal may be an external signal FLM or a previous output signal. The external signal FLM may be input to the first control stage CST1 as a start signal. In a subsequent control stage, the previous output signal may be input as a start signal. For example, the third output signal OUT3 may be input to the second control stage CST2 as a start signal.

In an embodiment, the first voltage VGH may be a positive voltage and the second voltage VGL may be a negative voltage. In the disclosure, a high-level voltage and a low-level voltage may respectively mean a positive voltage and a negative voltage but are not limited thereto. For example, a relatively high voltage among the two voltages may be referred to as a high-level voltage (first level voltage), and a relatively low voltage may be referred to as a low-level voltage (second level voltage).

Dummy drivers DM may be placed between adjacent driver sets. In an embodiment, the dummy driver DM may include a structure similar to that of the first driver (e.g., the 1-1 driver DR1-1 or the 1-2 driver DR1-2). For example, the dummy driver DM may include a control stage CST-DM and a plurality of output stages OST-DM that share the control stage CST-DM through a first node Q1 and a second node Q2. The dummy driver DM may not receive a start signal and therefore may not output an output signal. In an embodiment, the dummy driver DM may be omitted, and adjacent driver sets DRS may be spaced apart from each other.

Referring to FIG. 5, the 1-1 driver DR1-1 may include the first control stage CST1, the first output stage OST1, the second output stage OST2, and the third output stage OST3. The first control stage CST1, the first output stage OST1, the second output stage OST2, and the third output stage OST3 may each include at least one transistor. In an embodiment, the at least one transistor may be a P-channel transistor. The P-channel transistor may be a silicon transistor. The silicon transistor may include a silicon semiconductor, and the silicon semiconductor may include amorphous silicon, polysilicon, or the like. For example, the silicon transistor may be a low-temperature polycrystalline silicon (LTPS) thin-film transistor. A gate-ON voltage of the P-channel transistor may be a low-level voltage, and a gate-OFF voltage may be a high-level voltage.

A control stage, e.g., the first control stage CST1, may be connected to an input terminal IN, a first clock terminal CK1, and a second voltage input terminal V2. The first control stage CST1 may include a first transistor T1, a second transistor T2, and a third transistor T3.

The first transistor T1 may be connected between the input terminal IN and a first node Q1. A gate of the first transistor T1 may be connected to the first clock terminal CK1. The first transistor T1 may be turned on in response to a clock signal input to the first clock terminal CK1 and a start signal STV input to the input terminal IN may be transmitted to the first node Q1.

The clock signal input to the first clock terminal CK1 may be one of the first clock signal CLK1, the second clock signal CLK2, the third clock signal CLK3, and the fourth clock signal CLK4. FIG. 5 shows an embodiment in which the first clock signal CLK1 is input to the first clock terminal CK1.

The second transistor T2 may be connected to a second node Q2 and the first clock terminal CK1. A gate of the second transistor T2 may be connected to the first node Q1. The second transistor T2 may be turned on in response to a voltage of the first node Q1 and the clock signal input to the first clock terminal CK1 (e.g., the first clock signal CLK1) may be transmitted to the second node Q2.

The third transistor T3 may be connected to the second voltage input terminal V2 and the second node Q2. A gate of the third transistor T3 may be connected to the first clock terminal CK1. The third transistor T3 may be turned on in response to the clock signal input to the first clock terminal CK1 (e.g., the first clock signal CLK1) and a second voltage VGL input to the second voltage input terminal V2 may be transmitted to the second node Q2.

The first output stage OST1, the second output stage OST2, and the third output stage OST3 may each be connected to a first voltage input terminal V1, the second voltage input terminal V2, a second clock terminal CK2, and an output terminal OT. The output terminal OT may be connected to the above-described first output line. The first output stage OST1, the second output stage OST2, and the third output stage OST3 may direct output signals OUT1, OUT2, OUT3, respectively, through the output terminals OT in response to a voltage of the second node Q2 and a third node Q3. The first output stage OST1, the second output stage OST2, and the third output stage OST3 may each include a fourth transistor T4, a fifth transistor T5, and a sixth transistor T6.

The fourth transistor T4 may be connected between the first voltage input terminal V1 and the output terminal OT. A gate of the fourth transistor T4 may be connected to the second node Q2. The fourth transistor T4 may be a pull-up transistor that is configured to transmit a high-level voltage to the output terminal OT. The fourth transistor T4 may be turned on in response to a voltage of the second node Q2 and the first voltage VGH, which is a high-level voltage input to the first voltage input terminal V1, may be transmitted to the output terminal OT.

The fifth transistor T5 may be connected between the output terminal OT and the second clock terminal CK2. A gate of the fifth transistor T5 may be connected to the third node Q3. The fifth transistor T5 may be a pull-down transistor that is configured to transmit a low-level voltage to the output terminal OT. The fifth transistor T5 may be turned on in response to a voltage of the third node Q3 and a clock signal input to the second clock terminal CK2 mat be transmitted to the output terminal OT.

The clock signal input to the second clock terminal CK2 may be one of the first clock signal CLK1, the second clock signal CLK2, the third clock signal CLK3, and the fourth clock signal CLK4, except for the clock signal which is input to the first clock terminal CK1. For example, as shown in FIG. 5, the clock signal input to the second clock terminal CK2 may be one of the second clock signal CLK2, the third clock signal CLK3, and the fourth clock signal CLK4. Clock signals input to the second clock terminal CK2 of each output stage may be different. For example, as shown in FIG. 5, the second clock signal CLK2 may be input to the second clock terminal CK2 connected to the first output stage OST1, the third clock signal CLK3 may be input to the second clock terminal CK2 connected to the second output stage OST2, and the fourth clock signal CLK4 may be input to the second clock terminal CK2 connected to the third output stage OST3.

The sixth transistor T6 may be connected between the first node Q1 and the third node Q3. A gate of the sixth transistor T6 may be connected to the second voltage input terminal V2. The sixth transistor T6 may be turned on in response to the second voltage VGL input to the second voltage input terminal V2 and the signal transmitted to the first node Q1 may be transmitted to the third node Q3.

At least one of the first output stage OST1, the second output stage OST2, and the third output stage OST3 may further include at least one of a first capacitor C1 and a second capacitor C2. In FIG. 5, an embodiment in which the first output stage OST1 includes the first capacitor C1 and the second capacitor C2, and the second output stage OST2 and the third output stage OST3 include only the second capacitor C2 is shown.

The first capacitor C1 may be connected between the first voltage input terminal V1 and the second node Q2. The first capacitor C1 may maintain the voltage of the second node Q2 stable.

The second capacitor C2 may be connected between the output terminal OT and the third node Q3. When the third node Q3 is in a floating state, the second capacitor C2 may change a voltage of the third node Q3 in response to a voltage change of the output terminal OT by coupling. When a voltage of the output terminal OT decreases from a high-level to a low-level, the level of the voltage of the third node Q3 may decrease due to the coupling of the second capacitor C2. When a voltage of the output terminal OT increases from the low-level to the high-level, the level of the voltage of the third node Q3 may increase due to the coupling of the second capacitor C2.

Referring to FIG. 6, the first transistor T1 may include a 1-1 transistor T1-1 and a 1-2 transistor T1-2 connected in series. The 1-1 transistor T1-1 may be connected between the input terminal IN and the 1-2 transistor T1-2. The 1-2 transistor T1-2 may be connected between the 1-1 transistor T1-1 and the first node Q1. A gate of the 1-1 transistor T1-1 and a gate of the 1-2 transistor T1-2 may be connected to the first clock terminal CK1. The remaining structure is substantially the same as the structure described with reference to FIG. 5 and thus description thereof is omitted.

Referring to FIG. 7, an equivalent circuit diagram of the 1-2 driver DR1-2 is additionally shown. The overall structure of the 1-2 driver DR1-2 may be similar to that of the 1-1 driver DR1-1. A start signal, clock signals, and output signals of the 1-2 driver DR1-2 may be slightly different from those of the 1-1 driver DR1-1, as explained below.

The fourth output stage OST4 may direct the fourth output signal OUT4 to the output terminal OT. The fifth output stage OST5 may direct the fifth output signal OUT5 to the output terminal OT. The sixth output stage OST6 may direct the sixth output signal OUT6 to the output terminal OT.

The second control stage CST2 of the 1-2 driver DR1-2 may be connected to an input terminal IN. The second control stage CST2 may receive the third output signal OUT3 of the third output stage OST3 of the 1-1 driver DR1-1 as a start signal via the input terminal IN. In an embodiment, the input terminal IN connected to the second control stage CST2 may be connected to the output terminal OT connected to the third output stage OST3. In other words, the second control stage CST2 of the 1-2 driver DR1-2 may be connected to the third output stage OST3 of the 1-1 driver DR1-1.

Clock signals input to the 1-2 driver DR1-2 may be shifted from clock signals input to the 1-1 driver DR1-1. In the case of the 1-1 driver DR1-1, as shown in FIG. 7, the first clock signal CLK1 may be input to the first clock terminal CK1 connected to the first control stage CST1, the second clock signal CLK2 may be input to the second clock terminal CK2 connected to the first output stage OST1, the third clock signal CLK3 may be input to the second clock terminal CK2 connected to the second output stage OST2, and the fourth clock signal CLK4 may be input to the second clock terminal CK2 connected to the third output stage OST3. In the case of the 1-2 driver DR1-2, as shown in FIG. 7, the fourth clock signal CLK4 may be input to the first clock terminal CK1 connected to the second control stage CST2, the first clock signal CLK1 may be input to the second clock terminal CK2 connected to the fourth output stage OST4, the second clock signal CLK2 may be input to the second clock terminal CK2 connected to the fifth output stage OST5, and the third clock signal CLK3 may be input to the second clock terminal CK2 connected to the sixth output stage OST6.

Figure 8:
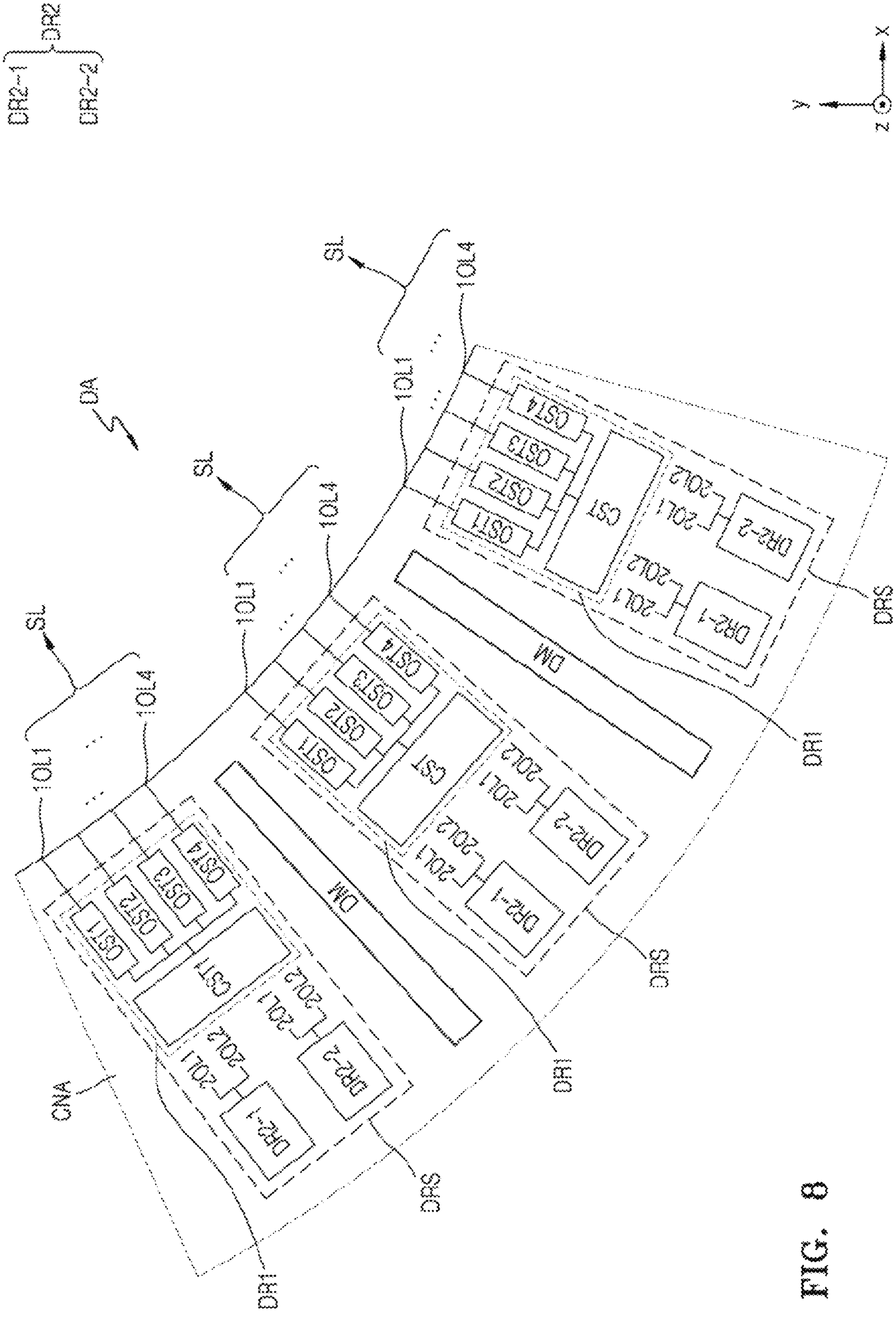
FIG. 8 is an enlarged plan view of a portion of a display apparatus according to an embodiment.
Figure 9:
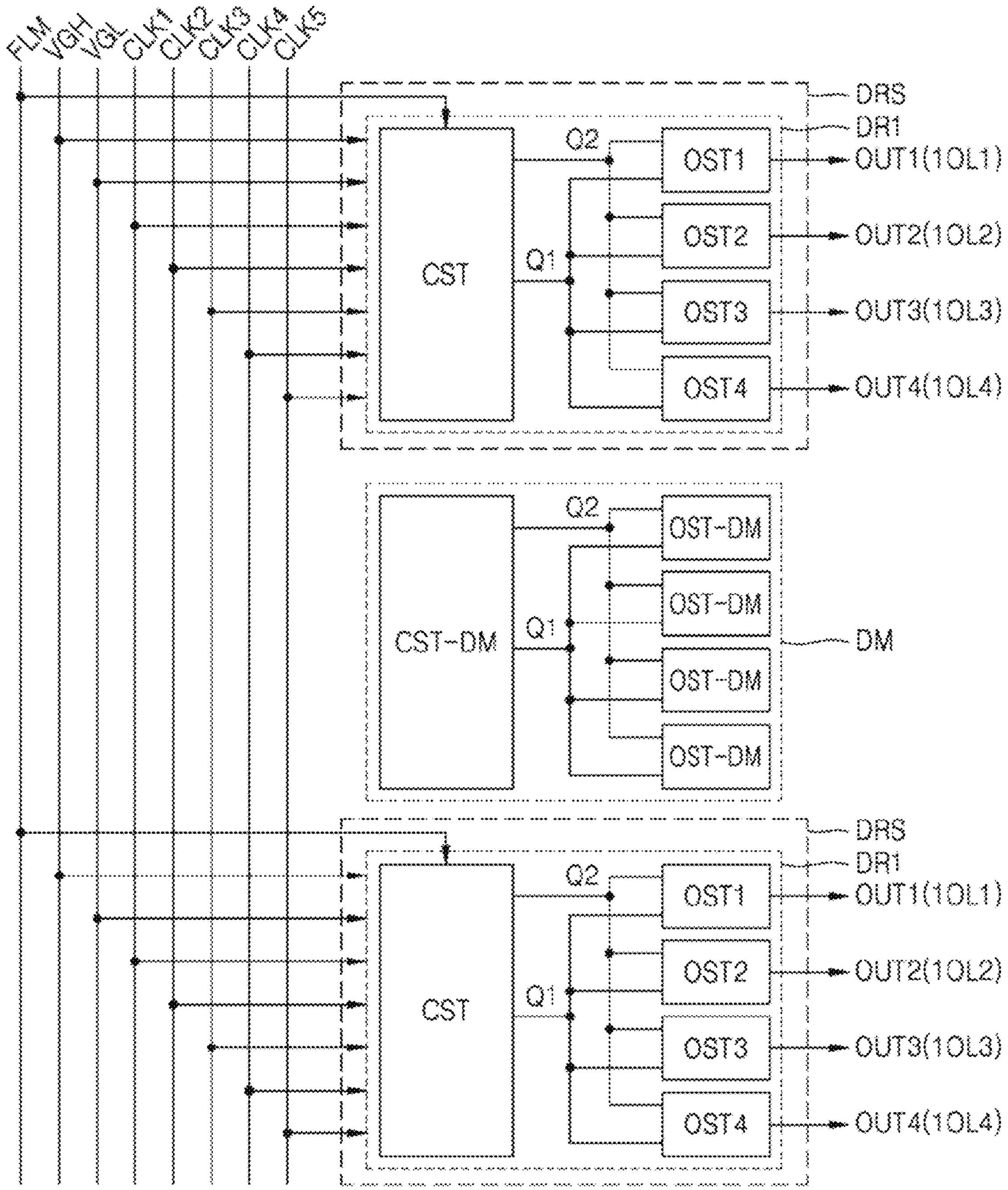
FIG. 9 is a schematic diagram of a driving circuit according to an embodiment.
Figure 10:
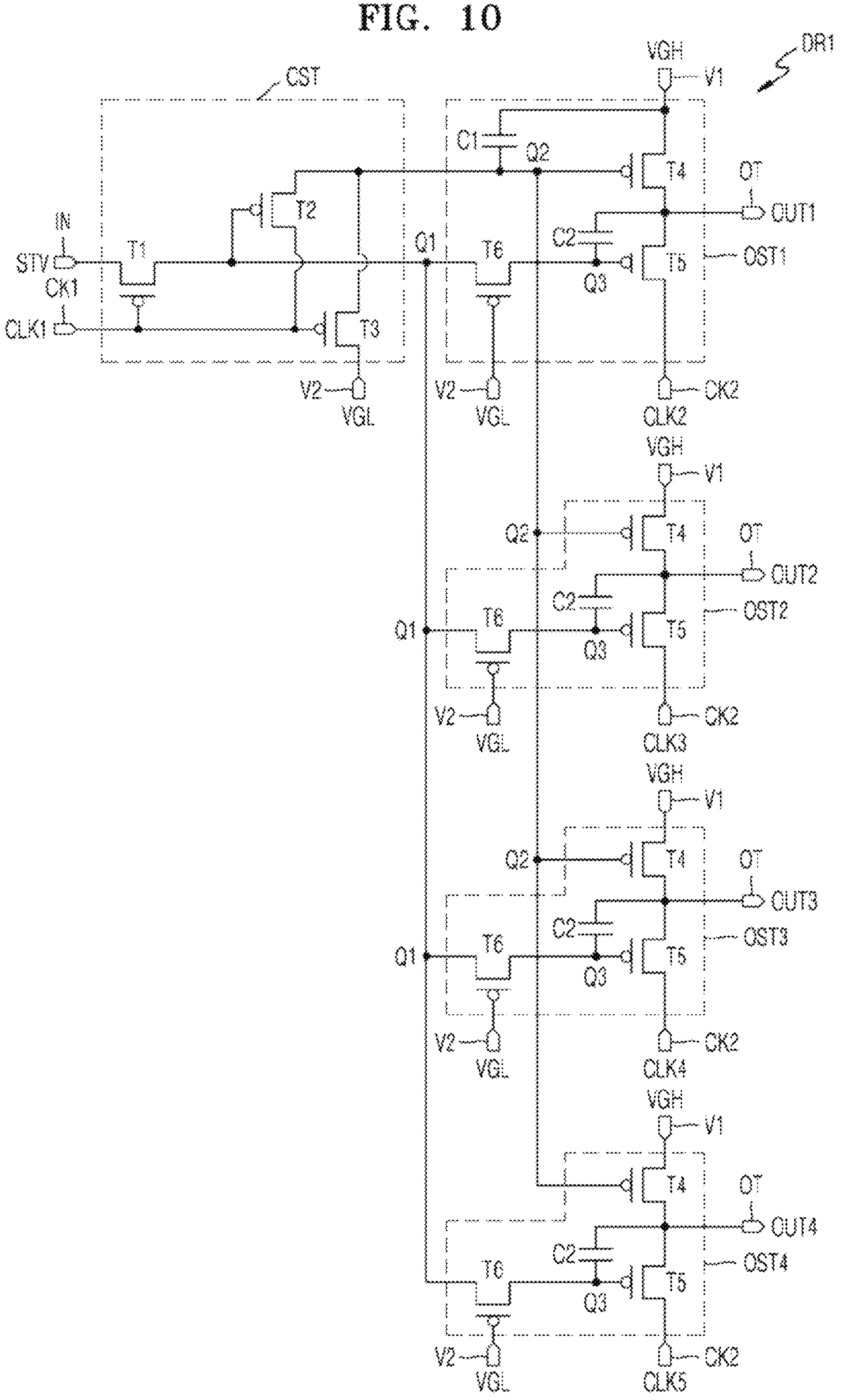
FIG. 10 is an equivalent circuit diagram of a driver according to an embodiment.
Figure 11:
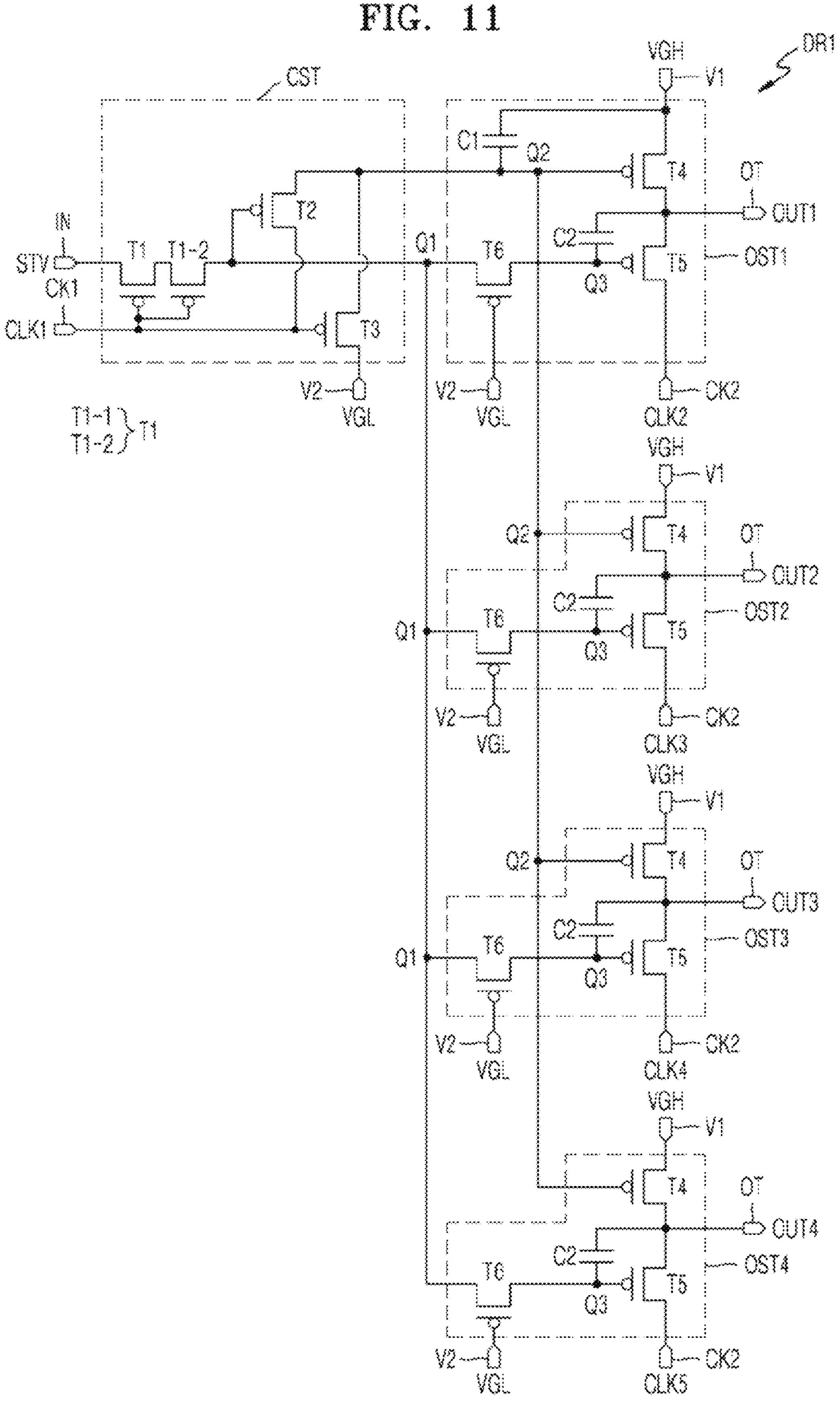
FIG. 11 is an equivalent circuit diagram of a driver according to an embodiment.

FIG. 8 is an enlarged plan view of a portion of a display apparatus according to an embodiment. FIG. 9 is a schematic diagram of a driving circuit according to an embodiment. FIGS. 10 and 11 are equivalent circuit diagrams of a driver according to an embodiment.

In the embodiment which is described below, m may be equal to 4, n may be equal to 2, o may be equal to 4, p may be equal to 1, and q may be equal to 2.

Referring to FIG. 8, the driver set DRS may include the first driver DR1 and the second driver DR2.

In the present embodiment, the driver set DRS may include one first driver DR1. In other words, in the present embodiment, p, which is the number of first drivers DR1 included in the driver set DRS, may be equal to 1.

In the present embodiment, the driver set DRS may include a plurality of second drivers DR2. For example, the driver set DRS may include two second drivers DR2, that is, a 2-1 driver DR2-1 and a 2-2 driver DR2-2. In other words, in the present embodiment, q, the number of second drivers DR2 included in the driver set DRS, may be equal to 2.

In the present embodiment, the first driver DR1 may include one control stage CST and four output stages. The first driver DR1 may include the control stage CST, the first output stage OST1, the second output stage OST2, the third output stage OST3, and the fourth output stage OST4.

In the present embodiment, each output stage may be connected to a corresponding first output line. For example, the first output stage OST1 may be connected to the 1-1 output line 1OL1, and the fourth output stage OST4 may be connected to the 1-4 output line 1OL4. The second output stage OST2 and the third output stage OST3 may also be connected to the corresponding first output lines. Accordingly, the first driver DR1 may be connected to four first output lines. In other words, the number m of first output lines connected to the first driver DR1 may be equal to 4. The first output lines 1OL1 to 1OL4 may be connected to the plurality of scan lines SL described above with reference to FIG. 1.

In the present embodiment, each second driver DR2 may be connected to corresponding second output lines. The 2-1 driver DR2-1 may be connected to the 2-1 output line 2OL1 and the 2-2 output line 2OL2. The 2-2 driver DR2-2 may be connected to the 2-1 output line 2OL1 and the 2-2 output line 2OL2. In other words, the number n of second output lines connected to one second driver DR2 may be equal to 2. Although not shown in FIG. 8, the second output lines 2OL1 and 2OL2 may be connected to the plurality of scan lines SL described above with reference to FIG. 1.

In the present embodiment, the driver set DRS may be provided in plurality and may be arranged along the curve of the corner area CNA. Dummy drivers DM may be placed between adjacent driver sets DRS.

Referring to FIG. 9, the driver set DRS may include the first driver DR1. In the present embodiment, the control stage CST, the first output stage OST1, the second output stage OST2, the third output stage OST3, and the fourth output stage OST4 may be grouped into the first driver DR1.

At least two output stages may share a control stage. In the present embodiment, the first output stage OST1, the second output stage OST2, the third output stage OST3, and the fourth output stage OST4 may share the control stage CST. For example, the first output stage OST1, the second output stage OST2, the third output stage OST3, and the fourth output stage OST4 may be connected to the control stage CST through common nodes such as the first node Q1 and the second node Q2.

Each of the output stages may be connected to the above-described first output line, and may generate an output signal and direct the output signal to the connected first output line. In the present embodiment, the first output stage OST1 may be connected to the 1-1 output line 1OL1 and may direct the first output signal OUT1 to the 1-1 output line 1OL1. In the present embodiment, the second output stage OST2 may be connected to the 1-2 output line 1OL2 and may direct the second output signal OUT2 to the 1-2 output line 1OL2. In the present embodiment, the third output stage OST3 may be connected to the 1-3 output line 1OL3 and may direct the third output signal OUT3 to the 1-3 output line 1OL3. In the present embodiment, the fourth output stage OST4 may be connected to the 1-4 output line 1OL4 and may direct the fourth output signal OUT4 to the 1-4 output line 1OL4.

The first driver DR1 may receive a start signal, a plurality of clock signals, a first voltage VGH, and s second voltage VGL, and may output a plurality of output signals.

In the present embodiment, the control stage CST may be connected to an input terminal to which a start signal is input, a first clock terminal, a first voltage input terminal to which the first voltage VGH is input, and a second voltage input terminal to which the second voltage VGL is input. In the present embodiment, the control stage CST may control a voltage of the first node Q1 and a voltage of the second node Q2 in response to a start signal input to an input terminal and a clock signal input to a first clock terminal.

Each of the output stages may be connected to a first voltage input terminal, a second voltage input terminal, and a second clock terminal, and may be connected to the first node Q1 and the second node Q2 to output an output signal of a first level voltage or a second level voltage in response to voltages of the first node Q1 and the second node Q2. In the present embodiment, the first output stage OST1 to the fourth output stage OST4 may each be connected to a first voltage input terminal, a second voltage input terminal, and a second clock terminal, and may be connected to the first node Q1 and the second node Q2 to output an output signal of a first level voltage or a second level voltage in response to voltages of the first node Q1 and the second node Q2.

In the present embodiment, the first driver DR1 may include four output stages. In the present embodiment, the number of clock signals input to the first driver DR1 may be five. In the present embodiment, the plurality of clock signals may include the first clock signal CLK1, the second clock signal CLK2, the third clock signal CLK3, the fourth clock signal CLK4, and a fifth clock signal CLK5.

The control stage CST and output stages may begin operation by receiving a start signal. A start signal may be an external signal FLM. In the present embodiment, the external signal FLM, which is a start signal, may be input to the control stage CST.

Dummy drivers DM may be placed between adjacent driver sets DRS. In an embodiment, the dummy driver DM may include a structure similar to that of the first driver DR1. For example, the dummy driver DM may include the control stage CST-DM and the plurality of output stages OST-DM that share the control stage CST-DM through the first node Q1 and the second node Q2. The dummy driver DM may not receive a start signal and therefore may not output an output signal. In an embodiment, the dummy driver DM may be omitted, and adjacent driver sets DRS may be spaced apart from each other.

Referring to FIG. 10, the overall structure of the first driver DR1 may be similar to that of the embodiment described with reference to FIG. 5. Therefore, the following description will focus on the differences from the embodiment shown in FIG. 5.

Compared to the embodiment shown in FIG. 5, the first driver DR1 may further include the fourth output stage OST4. The fourth output stage OST4 may be connected to the first voltage input terminal V1, the second voltage input terminal V2, the second clock terminal CK2, and the output terminal OT. The fourth output stage OST4 may direct the fourth output signal OUT4 through the output terminal OT. The fourth output stage OST4 may be connected to the first node Q1 and the second node Q2. The fourth output stage OST4 may include a fourth transistor T4, a fifth transistor T5, a sixth transistor T6, and a second capacitor C2.

In the present embodiment, the plurality of clock signals input to the first driver DR1 may include five clock signals. In the present embodiment, the five clock signals may include the first clock signal CLK1, the second clock signal CLK2, the third clock signal CLK3, the fourth clock signal CLK4, and the fifth clock signal CLK5.

The clock signal input to the second clock terminal CK2 may be one of the first clock signal CLK1, the second clock signal CLK2, the third clock signal CLK3, the fourth clock signal CLK4, and the fifth clock signal CLK5, except for the clock signal which is input to the first clock terminal CK1.

In FIG. 10, an embodiment in which the first clock signal CLK1 is input to the first clock terminal CK1, the second clock signal CLK2 is input to the second clock terminal CK2 connected to the first output stage OST1, the third clock signal CLK3 is input to the second clock terminal CK2 connected to the second output stage OST2, the fourth clock signal CLK4 is input to the second clock terminal CK2 connected to the third output stage OST3, and the fifth clock signal CLK5 is input to the second clock terminal CK2 connected to the fourth output stage OST4 is shown.

Referring to FIG. 11, similar to the case of FIG. 6, the first transistor T1 may include the 1-1 transistor T1-1 and the 1-2 transistor T1-2 connected in series. The 1-1 transistor T1-1 may be connected between the input terminal IN and the 1-2 transistor T1-2. The 1-2 transistor T1-2 may be connected between the 1-1 transistor T1-1 and the first node Q1. The gate of the 1-1 transistor T1-1 and the gate of the 1-2 transistor T1-2 may be connected to the first clock terminal CK1. The remaining structure is substantially the same as the structures described with reference to FIG. 10 and thus description thereof is omitted.

Figure 12:
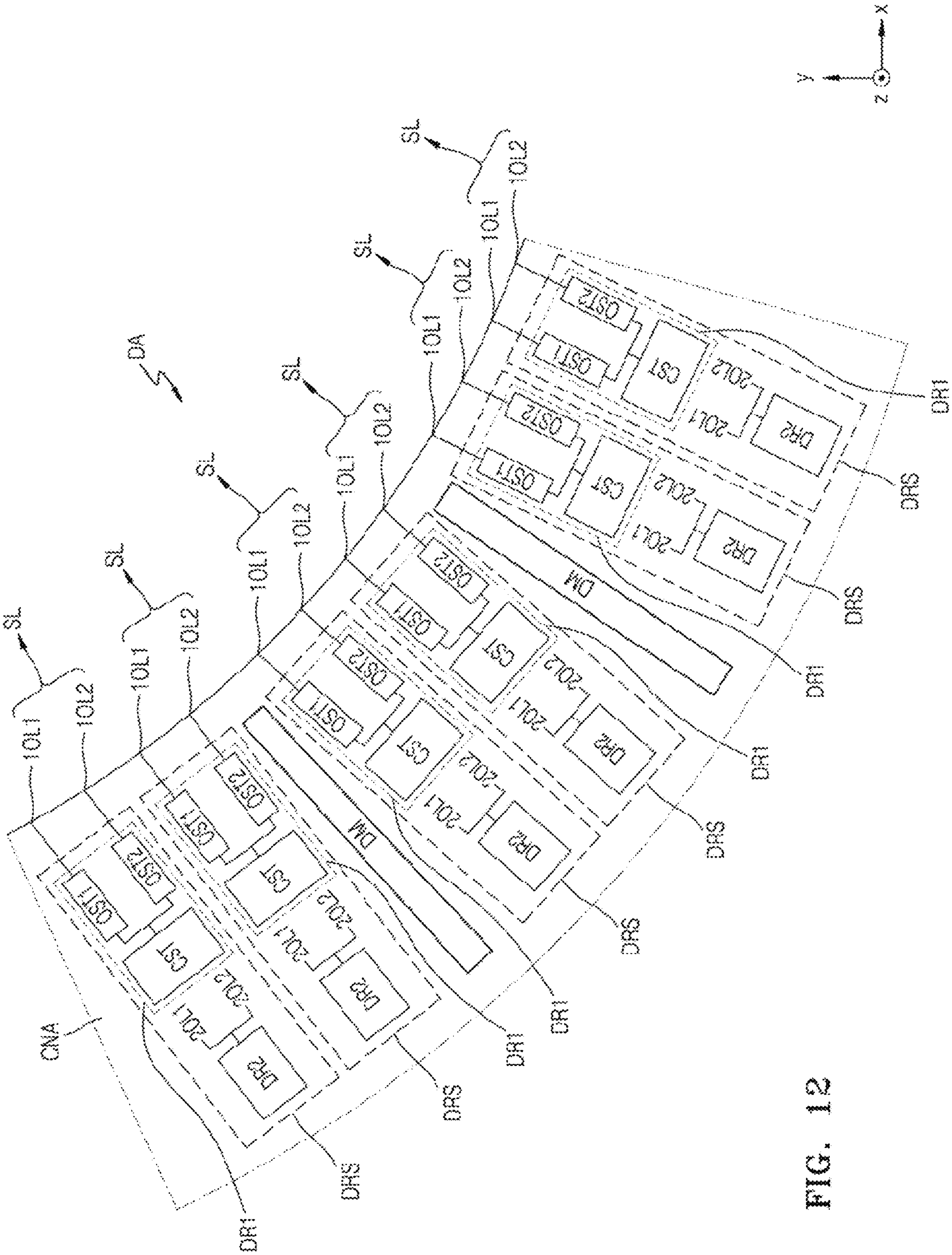
FIG. 12 is an enlarged plan view of a portion of a display apparatus according to an embodiment.
Figure 13:
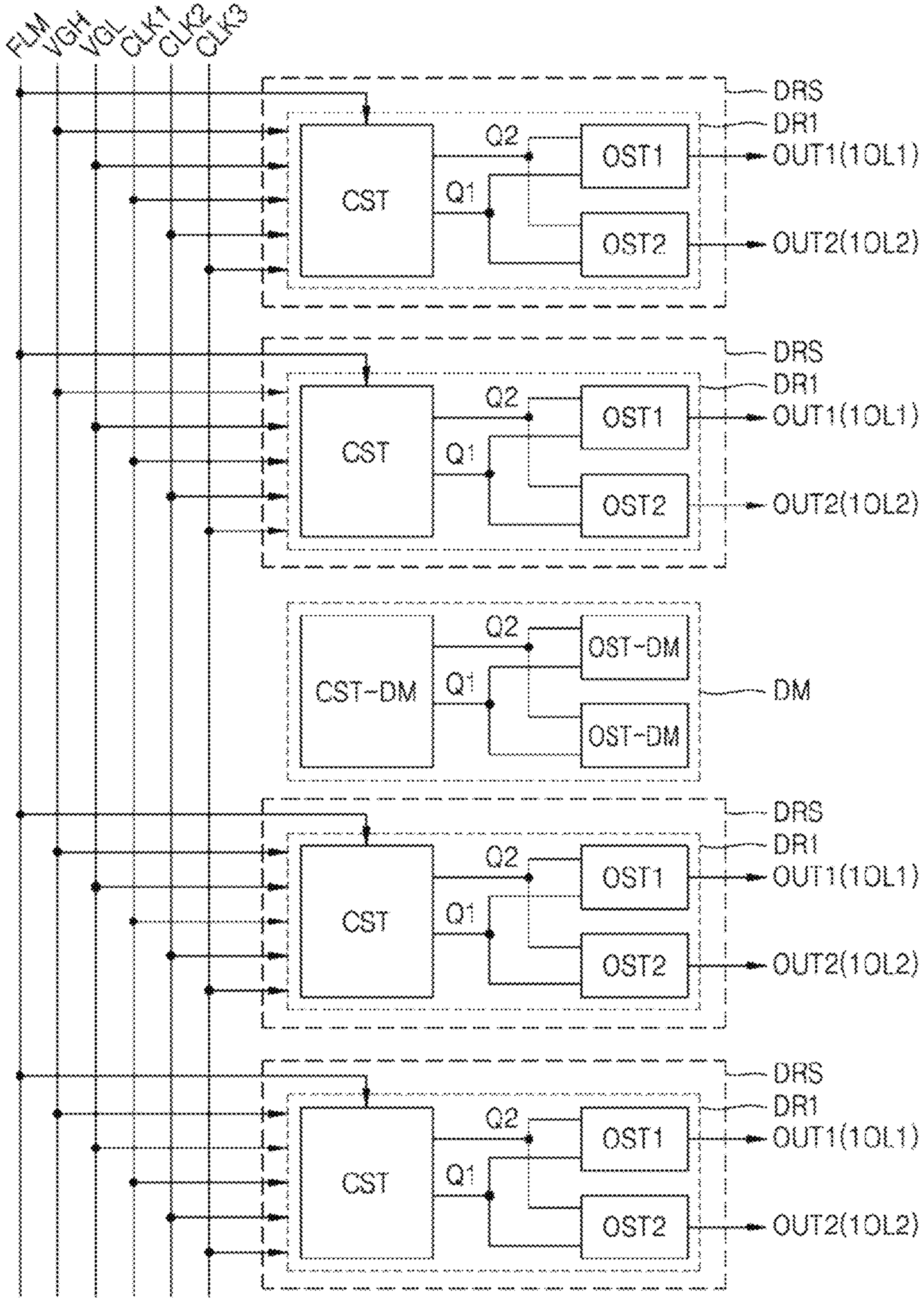
FIG. 13 is a schematic diagram of a driving circuit according to an embodiment.
Figure 14:
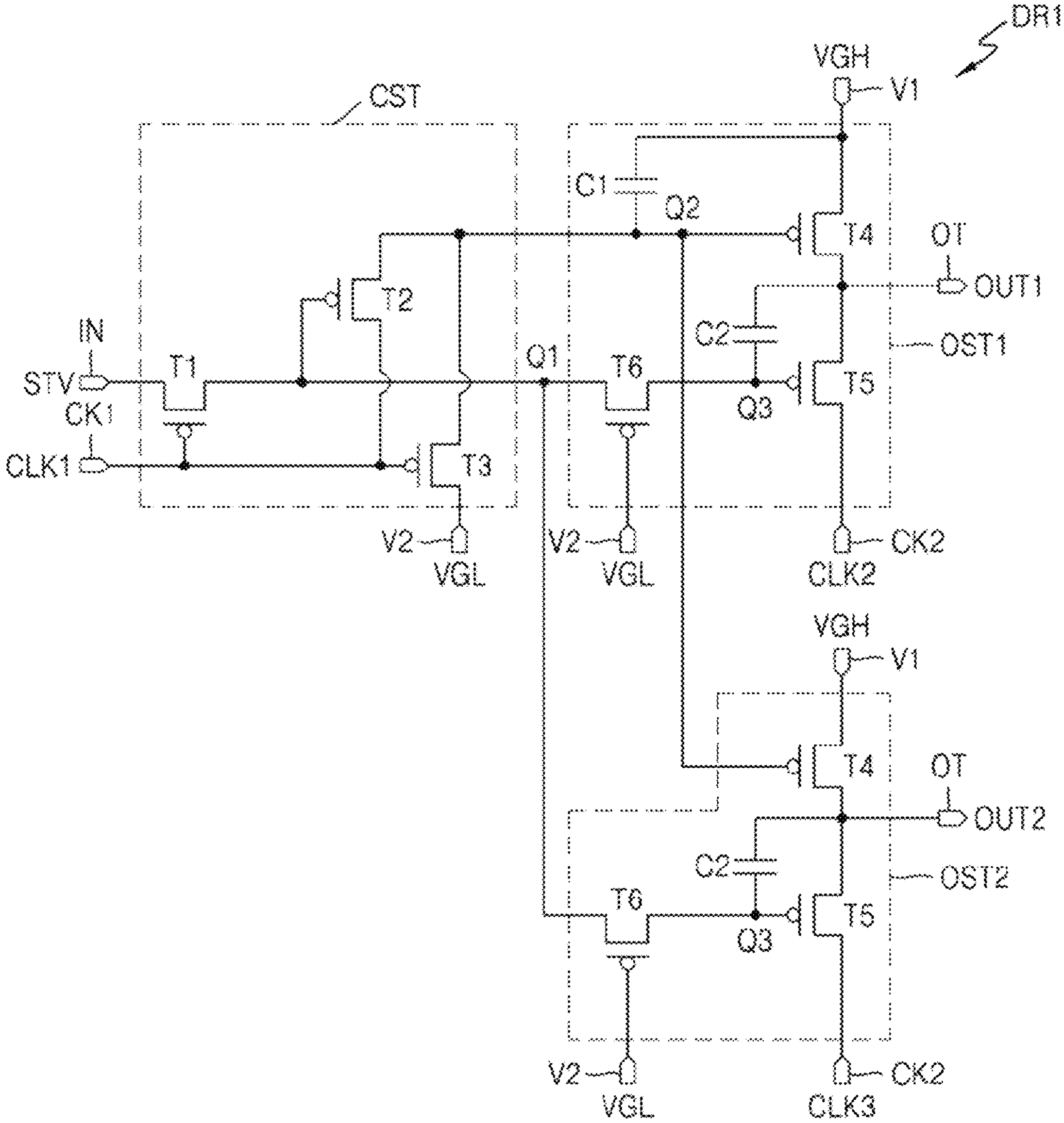
FIG. 14 is an equivalent circuit diagram of a driver according to an embodiment.
Figure 15:
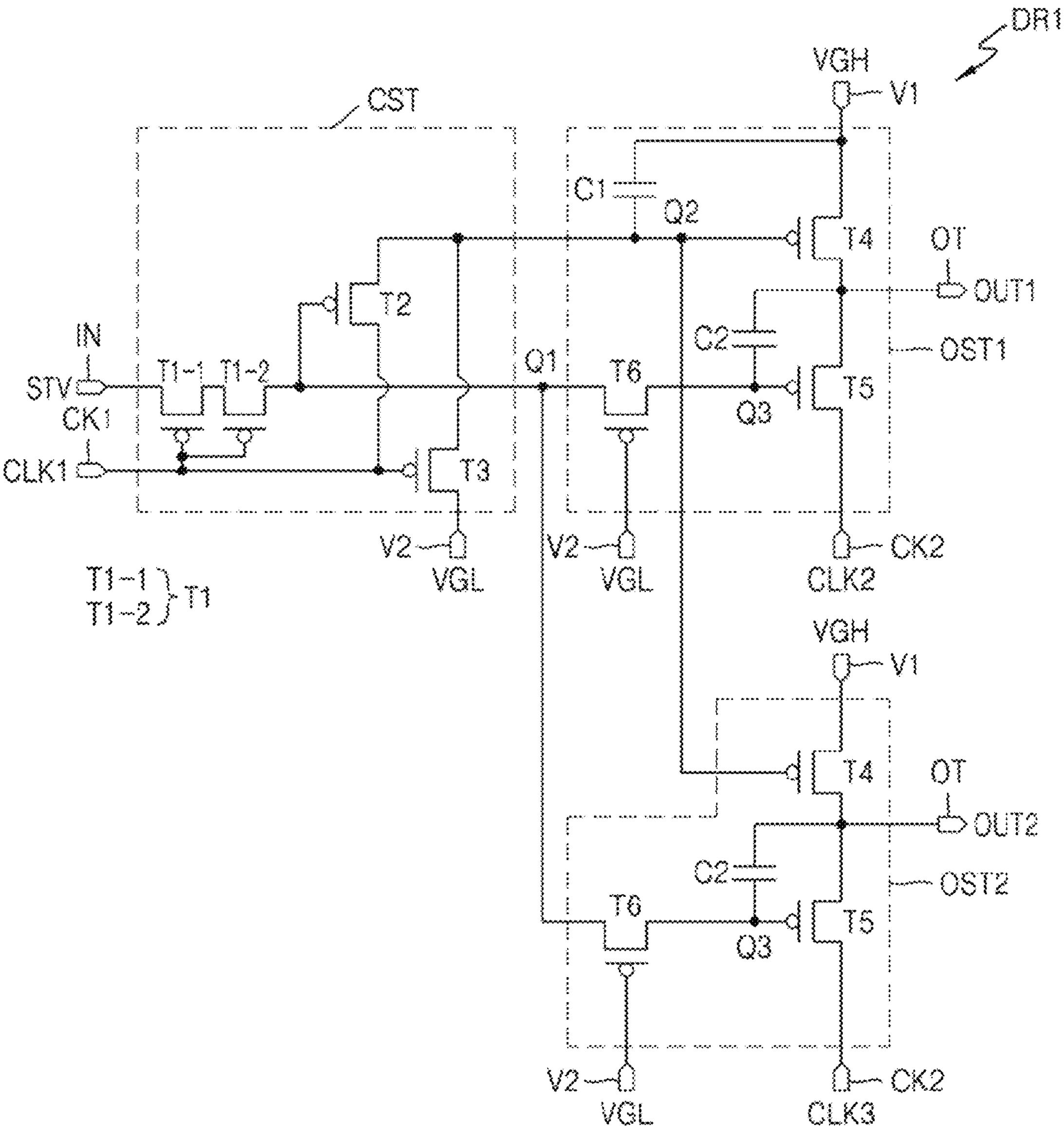
FIG. 15 is an equivalent circuit diagram of a driver according to an embodiment.

FIG. 12 is an enlarged plan view of a portion of a display apparatus according to an embodiment. FIG. 13 is a schematic diagram of a driving circuit according to an embodiment. FIGS. 14 and 15 are equivalent circuit diagrams of a driver according to an embodiment.

In the embodiment which is described below, m may be equal to 2, n may be equal to 2, o may be equal to 2, p may be equal to 1, and q may be equal to 1.

Referring to FIG. 12, the driver set DRS may include the first driver DR1 and the second driver DR2.

In the present embodiment, the driver set DRS may include one first driver DR1. In other words, in the present embodiment, p, which is the number of first drivers DR1 included in the driver set DRS, may be equal to 1.

In the present embodiment, the driver set DRS may include one second driver DR2. In other words, in the present embodiment, q, the number of second drivers DR2 included in the driver set DRS, may be equal to 1.

In the present embodiment, the first driver DR1 may include one control stage CST and two output stages. The first driver DR1 may include the control stage CST, the first output stage OST1, and the second output stage OST2.

In the present embodiment, each output stage may be connected to a corresponding first output line. For example, the first output stage OST1 may be connected to the 1-1 output line 1OL1, and the second output stage OST2 may be connected to the 1-2 output line 1OL2. Accordingly, the first driver DR1 may be connected to two first output lines. In other words, the number m of first output lines connected to the first driver DR1 may be equal to 2. The first output lines 1OL1 and 1OL2 may be connected to the plurality of scan lines SL described above with reference to FIG. 1.

In the present embodiment, the second driver DR2 may be connected to corresponding second output lines. For example, the second driver DR2 may be connected to the 2-1 output line 2OL1 and the 2-2 output line 2OL2. In other words, the number n of second output lines connected to one second driver DR2 may be equal to 2. Although not shown in FIG. 12, the second output lines 2OL1 and 2OL2 may be connected to the plurality of scan lines SL described above with reference to FIG. 1.

In the present embodiment, the driver set DRS may be provided in plurality and may be arranged along the curve of the corner area CNA. In the present embodiment, the dummy driver DM may or may not be between the driver sets DRS. Driver sets DRS between which the dummy driver DM is not arranged may be spaced apart from each other. FIG. 12 shows an example in which one dummy driver DM is placed between two driver sets DRS. However, the disclosure is not limited thereto, and as long as the spacing between drivers and/or the spacing between the output stages in the driver set DRS is maintained constant, the arrangement relationship between the driver set DRS and the dummy driver DM may vary.

Referring to FIG. 13, the driver set DRS may include the first driver DR1. In the present embodiment, the control stage CST, the first output stage OST1, and the second output stage OST2 may be grouped into the first driver DR1.

In the present embodiment, the first output stage OST1 and the second output stage OST2 may share the control stage CST. For example, the first output stage OST1 and the second output stage OST2 may be connected to the control stage CST through common nodes such as the first node Q1 and the second node Q2.

Each of the output stages may be connected to the above-described first output line, and may generate an output signal and direct the output signal to the connected first output line. In the present embodiment, the first output stage OST1 may be connected to the 1-1 output line 1OL1 and may direct the first output signal OUT1 to the 1-1 output line 1OL1. In the present embodiment, the second output stage OST2 may be connected to the 1-2 output line 1OL2 and may direct the second output signal OUT2 to the 1-2 output line 1OL2.

The first driver DR1 may receive a start signal, a plurality of clock signals, the first voltage VGH, and the second voltage VGL, and may output a plurality of output signals.

In the present embodiment, the control stage CST may be connected to an input terminal to which a start signal is input, a first clock terminal, a first voltage input terminal to which the first voltage VGH is input, and a second voltage input terminal to which the second voltage VGL is input. In the present embodiment, the control stage CST may control a voltage of the first node Q1 and a voltage of the second node Q2 in response to a start signal input to an input terminal and a clock signal input to a first clock terminal.

Each of the output stages may be connected to a first voltage input terminal, a second voltage input terminal, and a second clock terminal, and may be connected to the first node Q1 and the second node Q2 to output an output signal of a first level voltage or a second level voltage in response to voltages of the first node Q1 and the second node Q2. In the present embodiment, the first output stage OST1 and the second output stage OST2 may each be connected to a first voltage input terminal, a second voltage input terminal, and a second clock terminal, and may be connected to the first node Q1 and the second node Q2 to output an output signal of a first level voltage or a second level voltage in response to voltages of the first node Q1 and the second node Q2.

In the present embodiment, the first driver DR1 may include two output stages. In the present embodiment, the number of clock signals input to the first driver DR1 may be three. In the present embodiment, the plurality of clock signals may include the first clock signal CLK1, the second clock signal CLK2, and the third clock signal CLK3.

The control stage CST and output stages may begin operation by receiving a start signal. A start signal may be an external signal FLM. In the present embodiment, the external signal FLM, which is a start signal, may be input to the control stage CST.

Dummy drivers DM may be placed between adjacent driver sets DRS. In an embodiment, the dummy driver DM may include a structure similar to that of the first driver DR1.

For example, the dummy driver DM may include the control stage CST-DM and the plurality of output stages OST-DM that share the control stage CST-DM through the first node Q1 and the second node Q2. The dummy driver DM may not receive a start signal and therefore may not output an output signal. In an embodiment, the dummy driver DM may be omitted, and adjacent driver sets DRS may be spaced apart from each other.

Referring to FIG. 14, the overall structure of the first driver DR1 may be similar to that of the embodiment described with reference to FIG. 5. Therefore, the following description will focus on the differences from the embodiment shown in FIG. 5.

Compared to the embodiment shown in FIG. 5, the first driver DR1 may include only the first output stage OST1 and the second output stage OST2. The first output stage OST1 and the second output stage OST2 may be connected to the first voltage input terminal V1, the second voltage input terminal V2, the second clock terminal CK2, and the output terminal OT. The first output stage OST1 and the second output stage OST2 may direct the first output signal OUT1 and the second output signal OUT2, respectively, through the output terminals OT. The first output stage OST1 and the second output stage OST2 may be connected to the first node Q1 and the second node Q2. The first output stage OST1 may include the fourth transistor T4, the fifth transistor T5, the sixth transistor T6, the first capacitor C1, and the second capacitor C2. The second output stage OST2 may include the fourth transistor T4, the fifth transistor T5, the sixth transistor T6, and the second capacitor C2.

In the present embodiment, the plurality of clock signals input to the first driver DR1 may include three clock signals. In the present embodiment, the three clock signals may include the first clock signal CLK1, the second clock signal CLK2, and the third clock signal CLK3.

The clock signal input to the second clock terminal CK2 may be one of the first clock signal CLK1, the second clock signal CLK2, and the third clock signal CLK3, except for the clock signal which is input to the first clock terminal CK1. In FIG. 14, an embodiment in which the first clock signal CLK1 is input to the first clock terminal CK1, the second clock signal CLK2 is input to the second clock terminal CK2 connected to the first output stage OST1, and the third clock signal CLK3 is input to the second clock terminal CK2 connected to the second output stage OST2 is shown.

Referring to FIG. 15, similar to the case of FIG. 6, the first transistor T1 may include the 1-1 transistor T1-1 and the 1-2 transistor T1-2 connected in series. The 1-1 transistor T1-1 may be connected between the input terminal IN and the 1-2 transistor T1-2. The 1-2 transistor T1-2 may be connected between the 1-1 transistor T1-1 and the first node Q1. The gate of the 1-1 transistor T1-1 and the gate of the 1-2 transistor T1-2 may be connected to the first clock terminal CK1. The remaining structure is substantially the same as the structure described with reference to FIG. 14 and thus description thereof is omitted.

According to an embodiment as described above, a display apparatus is provided, wherein drivers of a driving circuit are grouped into a driver set based on a certain standard (e.g., the least common multiple of the number of output lines connected to each driver), and the drivers are spaced at regular intervals within the driver set. Accordingly, as the drivers within the same driver set are arranged at regular intervals, output deviation between the drivers may be reduced.

While one or more embodiments have been described with reference to the figures, it will be understood by one of ordinary skill in the art that various changes in form and details may be made therein. Therefore, the scope of the disclosure should be defined by the spirit and scope of the following claims.

What is claimed is:

1. A display apparatus comprising:
a substrate comprising a display area and a non-display area surrounding the display area;
a plurality of pixels disposed on the substrate in the display area;
a plurality of driver sets spaced apart from each other in the non-display area; and
a dummy driver located between two adjacent driver sets among the plurality of driver sets, wherein,
one driver set among the plurality of driver sets comprises at least one first driver and at least one second driver,
the at least one first driver is connected to m output lines connected to some of the plurality of pixels, the at least one first driver comprising a control stage and m output stages connected to the control stage, and
the at least one second driver is connected to n output lines connected to some of the plurality of pixels,
wherein m is not equal to n,
wherein, when a least common multiple of m and n is o, the one driver set comprises:
o/m first drivers and o/n second drivers;
wherein,
the control stage is connected to an input terminal to which a start signal is input, a first voltage input terminal to which a first voltage is input, and a second voltage input terminal to which a second voltage is input, and controls voltages of a first node and a second node,
each of the m output stages is connected to an output terminal connected to a corresponding output line among the m output lines, and
the m output stages are connected to the first node and the second node and share the control stage.

2. The display apparatus according to claim 1, wherein,
the m output stages are spaced apart from each other at regular intervals.

3. The display apparatus according to claim 1, wherein,
the control stage comprises:
a first transistor connected to the input terminal and the first node, and comprising a gate connected to a first clock terminal to which one of a plurality of clock signals is input;
a second transistor connected to the second node and the first clock terminal, and comprising a gate connected to the first node; and
a third transistor connected to the second voltage input terminal and the second node, and comprising a gate connected to the first clock terminal.

4. The display apparatus according to claim 3, wherein,
the first transistor comprises a 1-1 transistor and a 1-2 transistor,
the 1-1 transistor is connected to the input terminal and the 1-2 transistor,
the 1-2 transistor is connected to the first node and the 1-1 transistor, and
a gate of the 1-1 transistor and a gate of the 1-2 transistor are connected to the first clock terminal.

5. The display apparatus according to claim 3, wherein,
each of the m output stages comprises:
a fourth transistor connected to the first voltage input terminal and the output terminal, and comprising a gate connected to the second node;

a fifth transistor connected to the output terminal and a second clock terminal to which another one of the plurality of clock signals is input, and comprising a gate connected to a third node; and a sixth transistor connected to the first node and the third node, and comprising a gate connected to the second voltage input terminal.

6. The display apparatus according to claim 5, wherein, at least one of the m output stages further comprises at least one of:

a first capacitor connected to the first voltage input terminal and the second node; and a second capacitor connected to the output terminal and the third node.

7. The display apparatus according to claim 1, wherein, o/m is a natural number greater than or equal to 2, and one of the m output stages of one of the o/m first drivers is connected to the control stage of another one of the o/m first drivers.

8. The display apparatus according to claim 1, wherein, the non-display area comprises a corner area on a corner of the substrate, and the plurality of driver sets are arranged in the corner area.

9. The display apparatus according to claim 1, wherein, at least one of the m output lines connected to the first driver and at least one of the n output lines connected to the second driver are connected to a same pixel.

10. A display apparatus comprising:

a substrate comprising a display area and a non-display area surrounding the display area;

a plurality of pixels disposed on the substrate in the display area; and a driver set arranged in the non-display area and connected to at least one of the plurality of pixels, wherein, a first driver of the driver set comprises:

a control stage and m output stages connected to and sharing the control stage, and at least some of the m output stages are spaced apart from each other at regular intervals, wherein, the driver set comprises at least one second driver connected to n output lines connected to some of the plurality of pixels, wherein m is not equal to n, wherein, when a least common multiple of m and n is o, the driver set comprises:

o/m first drivers; and o/n second drivers; wherein, the control stage is connected to an input terminal to which a start signal is input, a first voltage input terminal to which a first voltage is input, and a second voltage input terminal to which a second voltage is input, and controls voltages of a first node and a second node, and each of the m output stages is connected to an output terminal configured to output an output signal to a corresponding output line, and the m output stages are connected to the first node and the second node and share the control stage.

11. The display apparatus according to claim 10, wherein, the control stage comprises:

a first transistor connected to the input terminal and the first node, and comprising a gate connected to a first clock terminal to which one of a plurality of clock signals is input;

a second transistor connected to the second node and the first clock terminal, and comprising a gate connected to the first node; and a third transistor connected to the second voltage input terminal and the second node, and comprising a gate connected to the first clock terminal.

12. The display apparatus according to claim 11, wherein, each of the m output stages comprises:

a fourth transistor connected to the first voltage input terminal and the output terminal, and comprising a gate connected to the second node;

a fifth transistor connected to the output terminal and a second clock terminal to which another one of the plurality of clock signals is input, and comprising a gate connected to a third node; and a sixth transistor connected to the first node and the third node, and comprising a gate connected to the second voltage input terminal.

13. The display apparatus according to claim 12, wherein, at least one of the m output stages further comprises at least one of:

a first capacitor connected to the first voltage input terminal and the second node; and a second capacitor connected to the output terminal and the third node.

14. The display apparatus according to claim 10, wherein, the driver set comprises at least two first drivers, and the output terminal of one of the m output stages of one of the at least two first drivers is connected to the input terminal of the control stage of another one of the at least two first drivers.

15. The display apparatus according to claim 10, wherein, the non-display area comprises a corner area on a corner of the substrate, and the driver set is arranged in the corner area.

16. The display apparatus according to claim 10, comprising:

a plurality of driver sets comprising the driver set; and a dummy driver located between adjacent two of the plurality of driver sets.

* * * * *